US012669766B2

(12) United States Patent
Isobe et al.

(10) Patent No.: US 12,669,766 B2
(45) Date of Patent: Jun. 30, 2026

(54) PRESSURIZATION DEVICE, FIXING DEVICE, AND IMAGE FORMING APPARATUS

(71) Applicant: CANON KABUSHIKI KAISHA, Tokyo (JP)

(72) Inventors: Kenichirou Isobe, Kanagawa (JP); Takafumi Suzuki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/821,692

(22) Filed: Aug. 30, 2024

(65) Prior Publication Data

US 2025/0076800 A1 Mar. 6, 2025

(30) Foreign Application Priority Data

Sep. 6, 2023 (JP) ................................ 2023-144452

(51) Int. Cl.
*G03G 15/20* (2006.01)
*B65H 5/06* (2006.01)
*G03G 15/00* (2006.01)

(52) U.S. Cl.
CPC ........... *G03G 15/206* (2013.01); *B65H 5/062* (2013.01); *G03G 15/2064* (2013.01); *G03G 15/6529* (2013.01); *B65H 2515/30* (2013.01)

(58) Field of Classification Search
CPC ........... G03G 15/2064; G03G 15/2053; G03G 15/2032; G03G 15/2017
See application file for complete search history.

(56) References Cited

U.S. PATENT DOCUMENTS 10,852,678 B1 * 12/2020 Inomata ............. G03G 15/2064
2014/0270875 A1 * 9/2014 Mimbu .............. G03G 15/2035 399/329
2016/0349684 A1 * 12/2016 Tanaka ................. G03G 15/206
2018/0157199 A1 * 6/2018 Onishi ............... G03G 15/2032
2020/0172359 A1 * 6/2020 Nanno ................. G03G 15/754

FOREIGN PATENT DOCUMENTS

JP 2015087701 A 5/2015

* cited by examiner

*Primary Examiner* — Jessica L Eley
(74) *Attorney, Agent, or Firm* — Canon U.S.A., Inc. IP Division

(57) ABSTRACT

In a cam mechanism including a pressurization member, a pressurization target member and a pressurization force generation member, a cam, a first member that moves the pressurization member by rotation of the cam and applies a pressurization force generated by the pressurization force generation member to the pressurization member, a second member that changes the pressurization force of the pressurization force generation member by the rotation of the cam are provided, wherein the cam includes a plurality of cam outer peripheral surfaces at different position in a rotational axis direction, and a first cam outer peripheral surface among the plurality of cam outer peripheral surfaces does not act on the first member in a positional relationship where at least a part of the first cam outer peripheral surface overlaps the first member.

12 Claims, 22 Drawing Sheets

PRESSURIZATION DEVICE, FIXING DEVICE, AND IMAGE FORMING APPARATUS

BACKGROUND

Field

The present disclosure relates to a pressurization device including a pressurization mechanism for causing a pressurization member to pressurize a pressurization target member, a fixing device, and an image forming apparatus.

Description of the Related Art

A fixing device using a heat roller method provided in an electrophotographic image forming apparatus includes a heating roller and a pressure roller that forms a nip portion with the heating roller. The fixing device heats a sheet to which a toner image is transferred while nipping and conveying the sheet in a fixing nip, thereby fixing the toner image to the sheet.

The fixing device includes a mechanism for bringing the heating roller close to the pressure roller or separating the heating roller from the pressure roller by the rotation of a cam, thereby switching between a pressurization state when the toner image is fixed to the sheet while the sheet is being conveyed and a pressure release state when the fixing device is in a standby state or a jam is cleared. A conventional pressurization mechanism generally includes a pressurization plate that causes a heating roller to pressurize a pressure roller with a pressurization force generated by a pressurization spring, and a cam that moves the pressurization plate by rotating.

In the configuration of this pressurization mechanism, when the heating roller is in the pressurization state, the spring force of the pressurization spring transmitted to the heating roller through the pressurization plate is the minimum. On the other hand, when the heating roller is in the pressure release state, the spring force of the pressurization spring transmitted to the heating roller through the pressurization plate is the maximum.

Thus, when the cam rotates and the heating roller transitions from the pressure release state to the pressurization state, the spring force of the pressurization spring is released at once from the state where the spring force is the maximum. By this motion, the cam is pushed at once via the pressurization plate, thereby rotating ahead of the driving force of the cam. Then, a sudden collision occurs in a driving unit on an input side, and a hitting sound is generated.

Japanese Patent Application Laid-Open No. 2015-87701 discusses a configuration in which a pressurization plate that causes a heating roller to pressurize a pressure roller with a pressurization force generated by a pressurization spring, a pressurization force variable plate that causes the pressurization force to act on the pressurization plate in a changeable manner, and a cam that acts on the pressurization plate and the pressurization force variable plate are disposed. In the configuration of this pressurization mechanism discussed in Japanese Patent Application Laid-Open No. 2015-87701, in a pressurization state, the spring force (the pressurization force) of the pressurization spring is the maximum. On the other hand, in a pressure release state, the spring force (the pressurization force) of the pressurization spring is the minimum. Thus, when the cam rotates and the heating roller transitions from the pressure release state to the pressurization state, the spring force of the pressurization spring is not released at once, and the generation of a hitting sound due to a collision in a driving unit by the preceding rotation of the cam is prevented. Further, in Japanese Patent Application Laid-Open No. 2015-87701, when the cam abuts both a first member (the pressurization plate) and a second member (the pressurization force variable plate) by the rotation of the cam, the rotational torques of the cam are caused to cancel out each other by the pressurization force, thereby reducing the preceding rotation of the cam and reducing a hitting sound due to a collision in the driving unit.

In the technique discussed in Japanese Patent Application Laid-Open No. 2015-87701, however, there is a timing when the effect of reducing a hitting sound due to a collision in the driving unit cannot be exerted. Specifically, this timing is the timing when a pressurization state illustrated in FIG. 2B switches to a pressure release state illustrated in FIG. 2A. As illustrated in FIGS. 2A and 2B, at the timing when the pressurization state transitions to the pressure release state, the cam abuts only the pressurization force variable plate. Thus, it is not possible to obtain the effect of causing the rotational forces of the cam to cancel out each other and reducing the preceding rotation of the cam. Further, at the above transition timing, the radius of the cam abruptly changes, and the spring force of the pressurization spring is released at once from the state where the spring force is the maximum. Thus, the cam is pushed at once via the pressurization force variable plate, thereby rotating ahead of the driving force of the cam. Thus, a sudden collision occurs in a driving unit on an input side, and a hitting sound is generated.

SUMMARY

The present disclosure is directed to providing a method for reducing an impact sound due to the preceding rotation of a cam both at the timing when a pressure release state transitions to a pressurization state and at the timing when the pressurization state transitions to the pressure release state.

According to some embodiments, a pressurization device that includes a pressurization member and a pressurization target member and switches between a pressurization state where the pressurization member pressurizes the pressurization target member and a pressure release state where the pressurization member does not pressurize the pressurization target member includes a pressurization force generation member configured to generate a pressurization force, a cam that is rotatably supported, a first member configured to abut the cam and change in position by rotation of the cam and configured to abut the pressurization member, move the pressurization member in a direction toward the pressurization target member and in a direction away from the pressurization target member and apply the pressurization force generated by the pressurization force generation member to the pressurization member, and a second member configured to abut the cam and change in position by the rotation of the cam and configured to make the pressurization force generated by the pressurization force generation member variable, wherein the cam includes a plurality of circumferentially formed cam outer peripheral surfaces at different positions in a rotational axis direction of the cam, and wherein the plurality of cam outer peripheral surfaces acts on the second member regardless of a phase of the cam, and a first cam outer peripheral surface among the plurality of cam outer peripheral surfaces does not act on the first member in a positional relationship where at least a part of the first cam outer peripheral surface overlaps the first member.

According to the present disclosure, it is possible to reduce an impact sound due to the preceding rotation of a cam both at the timing when a pressure release state transitions to a pressurization state and at the timing when the pressurization state transitions to the pressure release state.

Further features of the present disclosure will become apparent from the following description of exemplary embodiments with reference to the attached drawings.

DESCRIPTION OF THE EMBODIMENTS

Some exemplary embodiments, features, and aspects of the disclosure will be described in detail below based on the drawings. Although the exemplary embodiments of the present disclosure are examples of the best exemplary embodiment in the present disclosure, the present disclosure is not limited to the following exemplary embodiments, and various configurations can be replaced by other known configurations within the scope of the idea of the present disclosure.

Figure 2C:
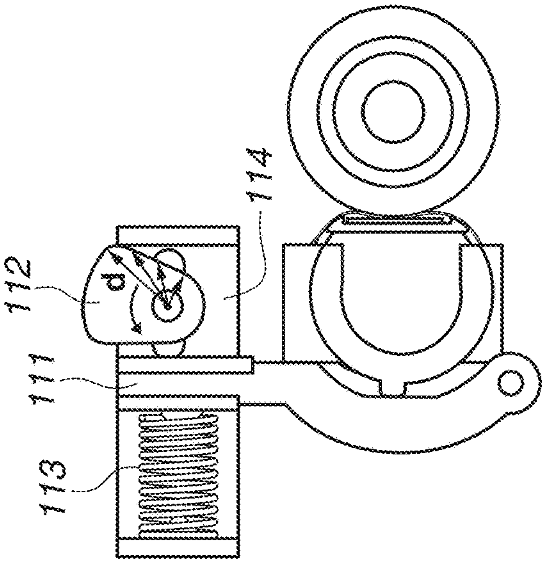
FIGS. 2A, 2B, and 2C are side views illustrating a configuration of a conventional pressurization mechanism.
Figure 2B:
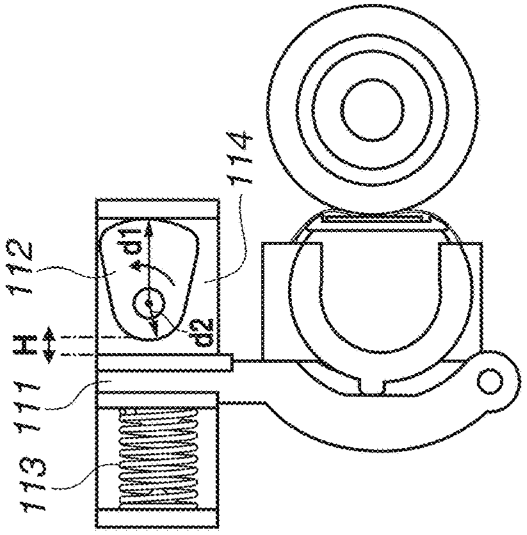
Figure 2A:
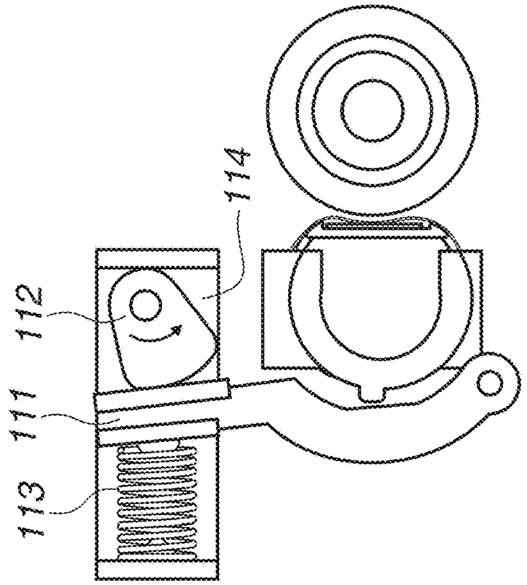

First, prior to the description of the present exemplary embodiments, with reference to FIGS. 2A, 2B, and 2C, a conventional pressurization force switching device is described. FIG. 2B is a diagram illustrating a pressurization state. To eliminate the loss of a pressurization force, a pressurization plate 111 and a cam 112 ensure a certain distance H therebetween without abutting each other. On the other hand, to stably exert the pressurization force as much as possible, it is preferable to change the positions of a pressurization spring 113 and a pressurization force variable plate 114 as much as possible. Thus, the shape of the cam 112 has a minimum radius d2 in a direction toward the pressurization plate 111 and has a maximum radius d1 in a direction toward the pressurization force variable plate 114 that exerts the pressurization force. Thus, the difference between the maximum radius d1 and the minimum radius d2 in the shape of the cam 112 is the active length of the pressurization spring 113. To stabilize the pressurization force, however, it is desirable to set the spring multiplier of the pressurization spring 113 to be small, and the active length to be great. A "pressurization spring" used in a fixing device has a strong pressure equivalent to several tens of kilograms.

To make the active length of the pressurization spring 113 great, i.e., to make the difference between the maximum radius d1 and the minimum radius d2 in the shape of the cam 112 great, an abrupt change in the radius of the cam 112 at the timing of the switching between a pressurization state and a pressure release state is unavoidable. In the conventional configuration, due to the state where the single cam 112 abuts both the pressurization plate 111 and the pressurization force variable plate 114, the rotational torques of the cam 112 cancel out each other, thereby reducing the preceding rotation of the cam 112. However, due to the space H between the cam 112 and the pressurization plate 111 ensured to eliminate the loss of the pressurization force or the abrupt change in the radius of the cam 112, there is a timing when the single cam 112 abuts only either one of the pressurization plate 111 and the pressurization force variable plate 114.

As illustrated in FIG. 2C, at the timing of transition from a pressurization state (FIG. 2B) to a pressure release state (FIG. 2A), the cam 112 abuts only the pressurization force variable plate 114 due to the space H between the cam 112 and the pressurization plate 111. Thus, it is not possible to obtain the effect of causing the rotational forces of the cam 112 to cancel out each other and reducing the preceding rotation of the cam 112.

Further, at the timing of transition from the pressurization state (FIG. 2B) to the pressure release state (FIG. 2A), an abrupt change in a radius d of the cam 112 acts, and the spring force of the pressurization spring 113 is released at once from the state where the spring force is the maximum. Thus, the cam 112 is pushed at once via the pressurization force variable plate 114, thereby rotating ahead of the driving force of the cam 112 (preceding rotation). Then, a sudden collision occurs in a driving unit on an input side, and a hitting sound is generated.

In the following exemplary embodiments, an example is described where, in a pressurization mechanism for causing a pressurization member to pressurize a pressurization target member by the rotation of a cam, an impact sound due to the preceding rotation of the cam is reduced both in transition from a pressure release state to a pressurization state and in transition from the pressurization state to the pressure release state. Further, a description is given of a pressurization mechanism in which the pressurization force of a pressurization member is not lost in a pressurization state.

With reference to FIGS. 1 and 3 to 10, a description is given of the configurations of a pressurization device according to a first exemplary embodiment of the present disclosure and an image forming apparatus to which the pressurization device is applied. The overall configuration of the image forming apparatus is described first, and the configurations of a fixing device and the pressurization device according to the present exemplary embodiment are described next.

Overall Configuration of Image Forming Apparatus

Figure 3:
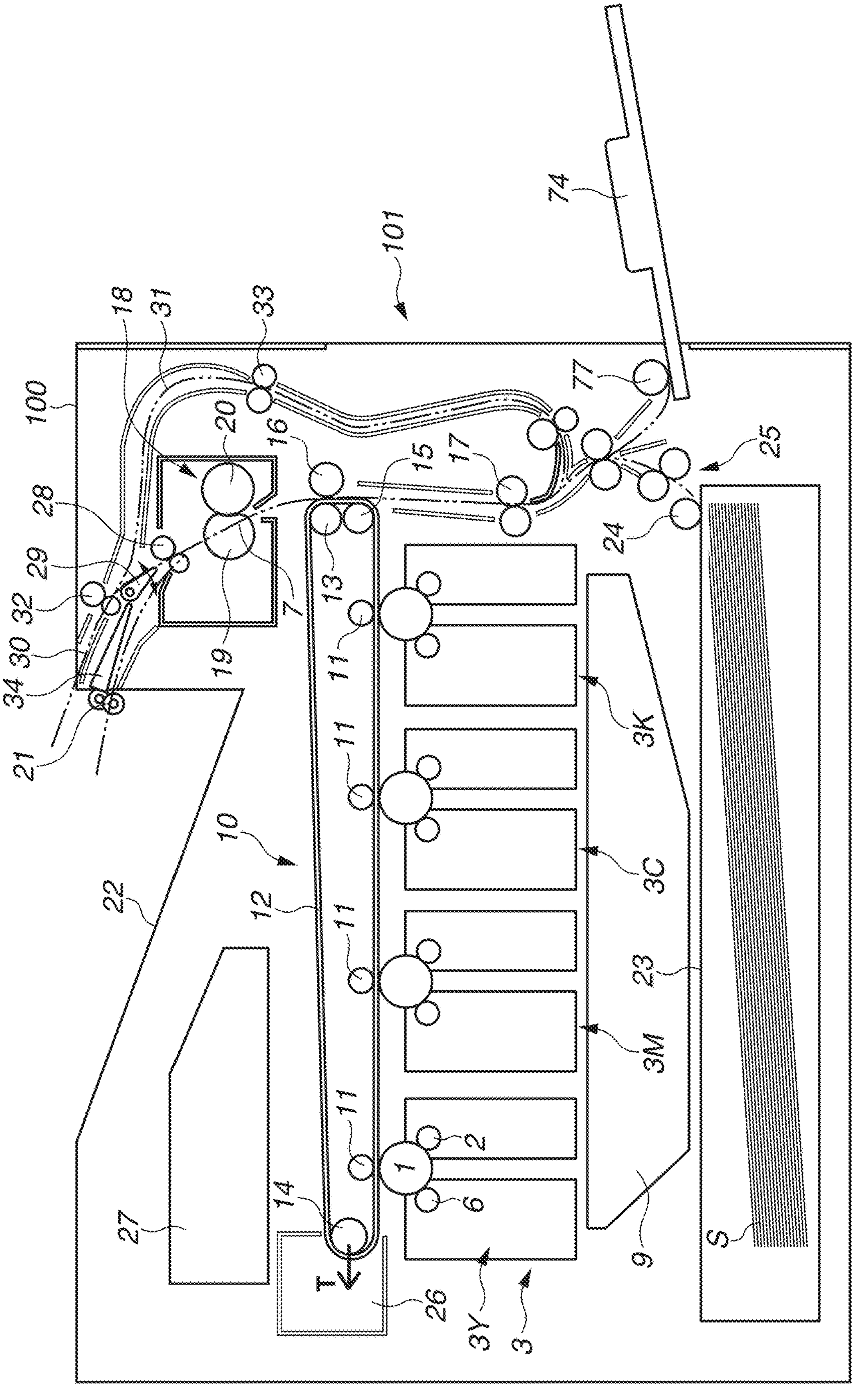
FIG. 3 is a schematic diagram illustrating a configuration of an image forming apparatus according to the first exemplary embodiment.

As illustrated in FIG. 3, an image forming apparatus 100 is a color laser beam printer that forms an image on a sheet S that is a recording medium. Based on image information read from a document or image information input from an external device, the image forming apparatus 100 forms an image on the sheet S and outputs the sheet S. Examples of the sheet S include plain paper, special paper such as coated paper, recording materials having special shapes, such as an envelope and index paper, overhead projector plastic film, and cloth.

An apparatus main body 101 of the image forming apparatus 100 includes an intermediate transfer tandem image forming unit 3 including four image forming units 3Y, 3M, 3C, and 3K and an intermediate transfer unit 10. The image forming units 3Y, 3M, 3C, and 3K form yellow, magenta, cyan, and black toner images, respectively. The configurations of the image forming units 3Y, 3M, 3C, and 3K are substantially similar to each other except for the color of toner for use in development, and therefore, the configurations of the image forming units 3Y, 3M, 3C, and 3K and the operations of forming toner images are described below using the configuration of the yellow image forming unit 3Y as an example.

If the image forming unit 3Y is requested to form a toner image, a photosensitive drum 1 that is a photosensitive member is rotationally driven, and a charging device 2 uniformly charges the surface of the photosensitive drum 1. An exposure device 9 placed in a lower portion of the apparatus main body 101 emits laser light to the photosensitive drum 1 based on image information so as to expose the surface of the drum 1, thereby forming an electrostatic latent image on the photosensitive drum 1. Then, the electrostatic latent image is visualized (developed) using toner supplied from a development device 6, thereby forming a toner image on the surface of the photosensitive drum 1.

Similarly, the image forming units 3M, 3C, and 3K also form toner images of the respective colors. The toner images formed by the image forming units 3M, 3C, 3Y, and 3K are primarily transferred from the photosensitive drums 1 to an intermediate transfer belt 12 as an intermediate transfer member by primary transfer rollers 11 so that the toner images overlap each other. Attached substances such as toner remaining on the photosensitive drums 1 are removed by cleaning devices provided in the image forming units 3M, 3C, 3Y, and 3K and are collected in a collection container 27.

The intermediate transfer belt 12 is wound around a secondary transfer inner roller 13 and a tension roller 14 and rotationally driven in the counterclockwise direction in FIG. 3. The tension roller 14 is biased in the direction of an arrow T by a biasing member, such as a spring, and applies appropriate tension to the intermediate transfer belt 12. The toner image borne on the intermediate transfer belt 12 is secondarily transferred to the sheet S in a secondary transfer portion formed by a secondary transfer roller 16 opposed to the secondary transfer inner roller 13 and the intermediate transfer belt 12. Attached substances, such as toner remaining on the intermediate transfer belt 12, are removed by a belt cleaning device 26 and collected in the collection container 27. The sheet S to which the toner image has been transferred is delivered to a fixing device 18. The fixing device 18 includes a heating roller 19, a pressure roller 20 opposed to the heating roller 19, and a heater 7 that is a heating element. The fixing device 18 applies heat and pressure to the toner image while nipping and conveying the sheet S. This fuses and firmly fixes the toner, thereby fixing the image to the sheet S. Although described below, in the present exemplary embodiment, the heating roller 19 is an example of a pressurization member, and the pressure roller 20 is an example of a pressurization target member.

In parallel with the above image forming process, a sheet feeding unit 25 feeds the sheet S toward the image forming unit 3. The sheet feeding unit 25 includes a feeding cassette 23 as a sheet storage unit, and a feeding roller 24 that sends out the sheet S from the feeding cassette 23. The sheet S sent out by the feeding roller 24 is conveyed toward a registration unit 17 in the state where the sheet S is separated from another sheet S by a separation method, such as a retard roller or a separation pad. The feeding roller 24 is an example of a sheet feeding unit capable of feeding the sheet S, and may be replaced by another feeding mechanism using an air feeding method.

The sheet S stacked in a manual-bypass tray 74 can also be sent out by a feeding roller 77.

The registration unit 17 corrects the skew of the sheet S and also sends out the sheet S toward the secondary transfer portion in time with the progress of the operation of forming the toner image by the image forming unit 3. Then, the sheet S on which the image has been formed while the sheet S passes through the secondary transfer portion and the fixing device 18 is delivered to a conveyance roller pair 28 located downstream of the fixing device 18. Downstream of the conveyance roller pair 28, a flap-like guide member 29 is disposed to sort the sheet S toward either of a discharge roller pair 21 and a two-sided conveyance unit. In the case of one-sided printing, the sheet S sent out from the conveyance roller pair 28 is guided toward a conveyance guide 34 by the guide member 29. The sheet S is conveyed toward the discharge roller pair 21 via the conveyance guide 34 and discharged by the discharge roller pair 21 to a discharge tray 22 provided in an upper portion of the apparatus main body 101.

In a case where two-sided printing is performed, the sheet S is guided to a switchback path 30 by the guide member 29. The two-sided conveyance unit switches the sheet S to the switchback path 30 and conveys the sheet S toward the image forming unit 3 again via a re-conveyance path 31 in the state where the front and back sides of the sheet S are reversed. Then, the sheet S on which an image has been formed by the image forming unit 3 on its back side is guided to the discharge roller pair 21 by the guide member 29 and discharged to the discharge tray 22.

The image forming unit 3 is an example of an image forming unit for forming an image on the sheet S, and may be replaced by an electrophotographic mechanism using a direct transfer method or another image forming mechanism using an inkjet method.

Two-Sided Conveyance Unit

Next, a description is given of the configuration of the two-sided conveyance unit as an example of a sheet conveyance device. The two-sided conveyance unit includes the switchback path 30, the re-conveyance path 31, and a switchback roller pair 32. The switchback roller pair 32 provided as a reverse conveyance unit is a roller pair capable of being driven in a forward direction and a backward direction. The switchback roller pair 32 reverses the received sheet S by switching the direction of the sheet S. The switchback roller pair 32 rotates in the forward direction, thereby conveying the received sheet S to the position where a downstream portion of the sheet S in the conveyance direction protrudes above the discharge tray 22.

If the rear end of the sheet S passes through the guide member 29, the guide member 29 switches to the direction of guiding the sheet S to the switchback path 30, and the switchback roller pair 32 starts rotating backward before the rear end of the sheet S comes through a nip portion. Since the guide member 29 is switched to the direction of guiding the sheet S to the re-conveyance path 31, the guide member 29 guides the sheet S conveyed by the backward rotation of the switchback roller pair 32 to the re-conveyance path 31 and restricts the backward conveyance of the sheet S.

In the re-conveyance path 31 that is a sheet conveyance path extending from the switchback roller pair 32 to the registration unit 17 in an approximately up-down direction, a re-conveyance roller pair 33 is placed. The re-conveyance roller pair 33 conveys the sheet S received from the switchback roller pair 32 toward the registration unit 17.

Next, the configurations of the fixing device and the pressurization mechanism are described.

Fixing Device

Figure 1:
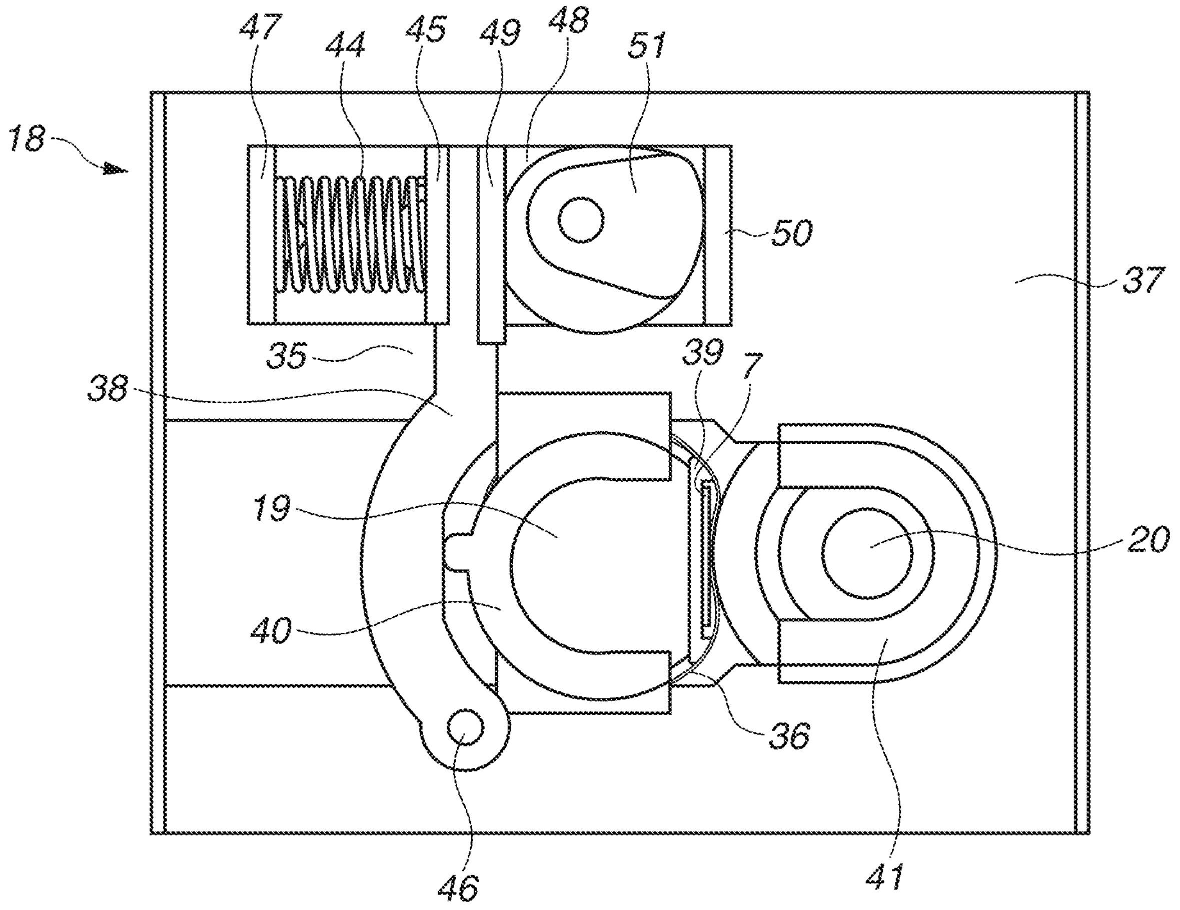
FIG. 1 is a side view illustrating a configuration of a pressurization mechanism according to a first exemplary embodiment.
Figure 4:
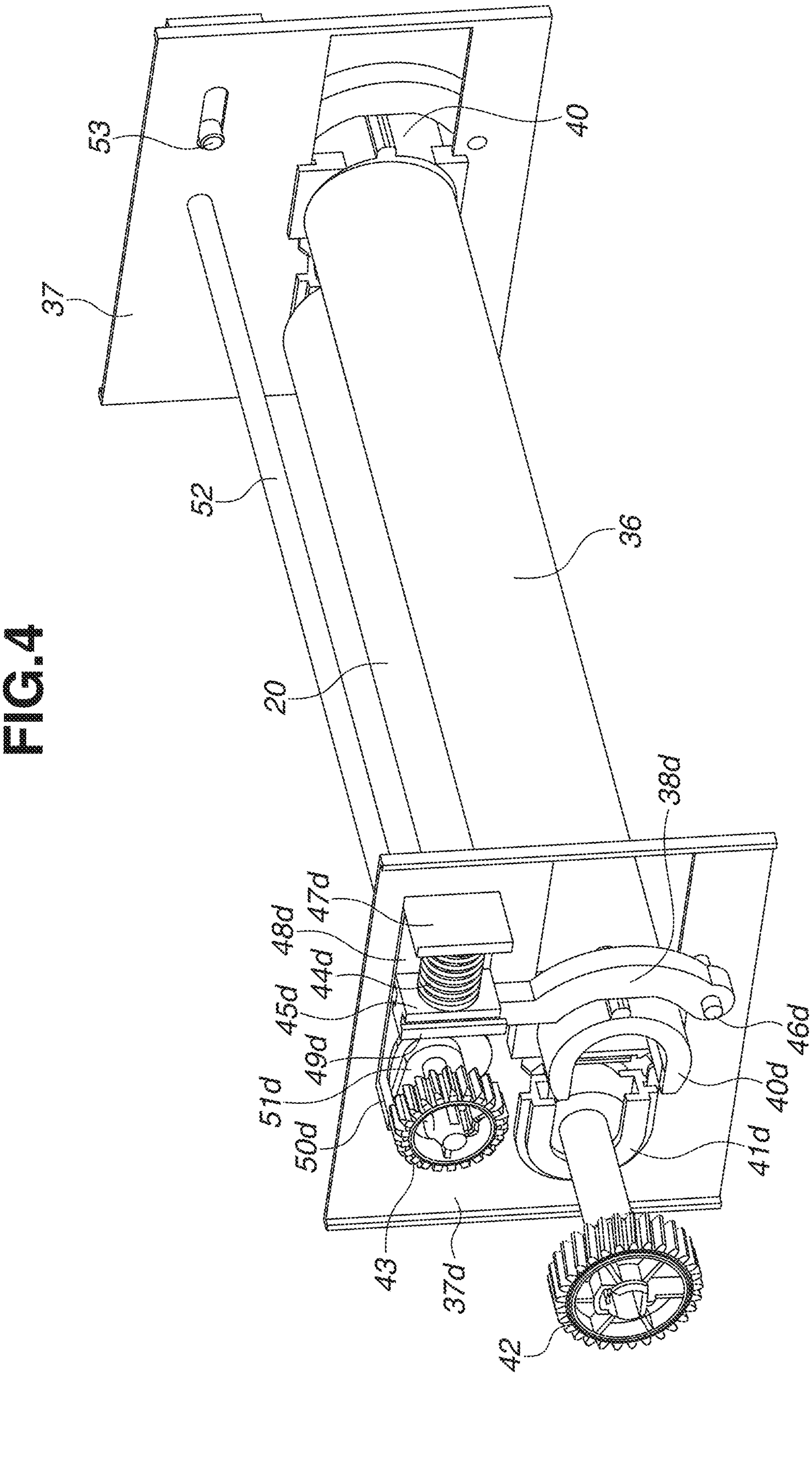
FIG. 4 is a perspective view illustrating relationships between the pressurization mechanism, a heating roller, and a pressure roller according to the first exemplary embodiment.

FIG. 1 is a side view illustrating the fixing device 18 including a pressurization mechanism 35 according to a first exemplary embodiment as seen from a non-driving side. FIG. 4 is a perspective view illustrating the relationships between the pressurization mechanism 35, the heating roller 19, and the pressure roller 20 of the fixing device 18. The fixing device 18 is a fixing device using a heat fixing method that causes a sleeve 36 to heat an unfixed toner image transferred to the sheet S.

The fixing device 18 includes the heating roller 19, the pressure roller 20, and the pressurization mechanism 35. The heating roller 19 is an example of a pressurization member. The pressure roller 20 is an example of a pressurization target member. The pressurization mechanism 35 is an example of a pressurization device. The fixing device 18 including the pressurization mechanism 35 is an example of the application of the pressurization device according to the present exemplary embodiment to the fixing device 18.

The fixing device 18 includes a frame 37 forming a frame body of the fixing device 18. The heating roller 19, the pressure roller 20, and the pressurization mechanism 35 are supported by the frame 37.

The heating roller 19 includes the heater 7 that is a heating element, and a heater holder 39 that supports the heater 7. Further, the heating roller 19 includes the tubular sleeve 36 loosely provided on the outer periphery of the heater holder 39, and flanges 40 disposed at both ends in the longitudinal direction of the sleeve 36.

In the heating roller 19, the flanges 40 are movably supported by the frame 37, and the heating roller 19 can pressurize the sleeve 36 against the pressure roller 20.

The pressure roller 20 is supported to rotate via bearings 41 at its both ends by the frame 37 and disposed so that the surface of the pressure roller 20 comes into contact with the surface of the sleeve 36 of the heating roller 19. Then, a gear 42 is firmly fixed to one shaft portion of the pressure roller 20.

The fixing device 18 according to the present exemplary embodiment is configured so that pressurization plates 38 apply pressurization forces to the flanges 40 of the heating roller 19, thereby pressurizing the sleeve 36 in a direction orthogonal to the generatrix direction of the pressure roller 20. The flanges 40 are pressurized, whereby the heater 7 pressurizes the pressure roller 20 via the sleeve 36. This elastically deforms an elastic layer of the pressure roller 20 by crushing the elastic layer, and the surface of the sleeve 36 and the surface of the pressure roller 20 form a nip having a predetermined width to heat and fix the unfixed toner image.

The heating fixing processing operation of the fixing device 18 is described. The driving force of a motor (not illustrated) included in the apparatus main body 100 is transmitted to the gear 42, thereby rotationally driving the pressure roller 20. The sleeve 36 rotates following the rotation of the pressure roller 20 while the inner peripheral surface (the inner surface) of the sleeve 36 slides in contact with the heater 7 and the heater holder 39.

While the sheet S to which the unfixed toner image has been transferred is nipped and conveyed in a nip portion N, the heat of the heater 7 and the pressure of the nip portion N are applied to the unfixed toner image. This heats and fixes the toner image onto the sheet S.

In the present exemplary embodiment, as an example of the configuration of the heating roller 19, a configuration has been described in which the heater 7 that is a heating element and the sleeve 36 are used. Alternatively, a configuration may be employed in which a sleeve itself generates heat by placing a core and a wound coil within the sleeve and applying a circulating current.

Pressurization Mechanism

With reference to FIGS. 1 and 4, the configuration of the pressurization mechanism (also referred to as "cam mechanism") 35 is described. The pressurization mechanism 35 is configured to be symmetric with respect to the center in the longitudinal direction of the heating roller 19 except that the pressurization mechanism 35 includes a gear 43 on one end portion side in the longitudinal direction of the pressurization mechanism 35. Regarding component members of the pressurization mechanism 35, members on a driving side including the gear 43 are distinguished from members on the non-driving side by adding "d" to the ends of the signs of the members on the driving side. The same applies to a pressurization mechanism 35 described in a second exemplary embodiment.

The pressurization mechanism 35 includes a pressurization spring 44*d* constituted by a compression spring that is caused to contract from its both end portions and generate a pressurization force in the direction in which it expands. The pressurization spring 44*d* is an example of a pressurization force generation member. The pressurization spring 44*d* is disposed in approximately parallel with the moving direction of the heating roller 19 downstream of the fixing nip portion N in the conveyance direction of the sheet.

The pressurization mechanism 35 also includes a pressurization plate 38*d* including at its one end a spring supporting surface 45*d* that holds down one end of the pressurization spring 44*d*, and a pivot point portion 46*d* as a pivot point of the pivotal movement of the pressurization plate 38*d* at the other end. The pressurization plate 38*d* is an example of a first member that applies a pressurization force generated by the pressurization force generation member to the pressurization member.

The pressurization plate 38*d* is disposed to be opposed to a supporting portion of a flange 40*d* in the moving direction of the heating roller 19 and holds down one end of the pressurization spring 44*d*.

The pressurization plate 38*d* supporting the pressurization spring 44*d* on the spring supporting surface 45*d* pivots about the pivot point portion 46*d* as the pivot point by receiving a pressurization force generated by the pressurization spring 44*d*. Consequently, the pressurization plate 38*d* presses a projection portion of the flange 40*d*, and the heating roller 19 pressurizes the pressure roller 20.

The pressurization mechanism 35 further includes a pressurization force variable plate 48*d* including at its one end a spring supporting surface 47*d* that holds down the other end of the pressurization spring 44*d*. The pressurization force variable plate 48*d* is an example of a second member that makes the pressurization force generated by the pressurization force generation member variable.

The pressurization force variable plate 48*d* is disposed to move in a sliding manner in approximately parallel with the expansion/contraction direction of the pressurization spring 44*d* and supports the other end of the pressurization spring 44*d* on the spring supporting surface 47*d*.

With the above configuration, the pressurization force variable plate 48*d* moves in a sliding manner, thereby causing the pressurization force generated by the pressurization spring 44*d* to act on the pressurization plate 38*d* in a changeable manner.

The pressurization mechanism 35 also includes a cam 51*d* between a cam abutment surface 49*d* placed on the opposed side of the spring supporting surface 45*d* in the pressurization plate 38*d*, and a cam abutment surface 50*d* located at an end of the pressurization force variable plate 48*d* on a different side from the spring supporting surface 47*d*. The cam 51*d* is fixedly held in an end portion in the longitudinal direction of a cam shaft 52 disposed along the longitudinal directions of the sleeve 36 and the pressure roller 20. The cam shaft 52 is rotatably supported by the frame 37. In one end portion in the longitudinal direction of the cam shaft 52, the gear 43 is fixedly held. The gear 43 is rotationally driven by receiving a driving force from a motor (a driving source) (not illustrated) of the apparatus main body 100.

If the cam 51*d* rotates, cam outer peripheral surfaces that are outer peripheral surfaces of the cam 51*d* abut the cam abutment surface 49*d* of the pressurization plate 38*d* and the cam abutment surface 50*d* of the pressurization force variable plate 48*d*. By this motion, the pressurization plate 38*d* pivots about the pivot point portion 46*d* as the pivot point and presses or separates from the projection portion of the flange 40*d*. By this motion, the heating roller 19 comes close to or moves away from the pressure roller 20, thereby switching between a pressurization state and a pressure release state.

The pressurization force variable plate 48*d* moves in a sliding manner while being supported by two shafts, namely the cam shaft 52 and a supporting shaft 53, thereby causing the pressurization spring 44*d* to expand and contract. This changes the pressurization force to be applied to the pressurization plate 38*d*. The position of the pressurization force variable plate 48*d* is restricted by the cam shaft 52 that holds the cam 51*d* to which a great force is applied. This results in a configuration in which the relative positional relationship between the cam 51*d* and the pressurization force variable plate 48*d* is less likely to be influenced by a strain that may occur when the pressurization force is applied.

Next, the details of the shapes of a cam and a cam abutment surface A are described.

Shape of Cam According to First Exemplary Embodiment

Figure 5B:
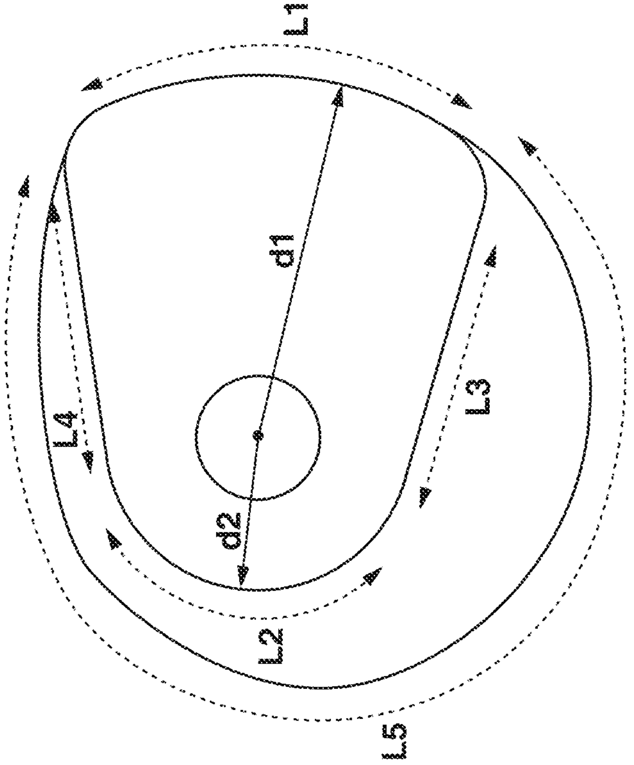
FIGS. 5A and 5B are diagrams illustrating a shape of a cam according to the first exemplary embodiment.
Figure 5A:
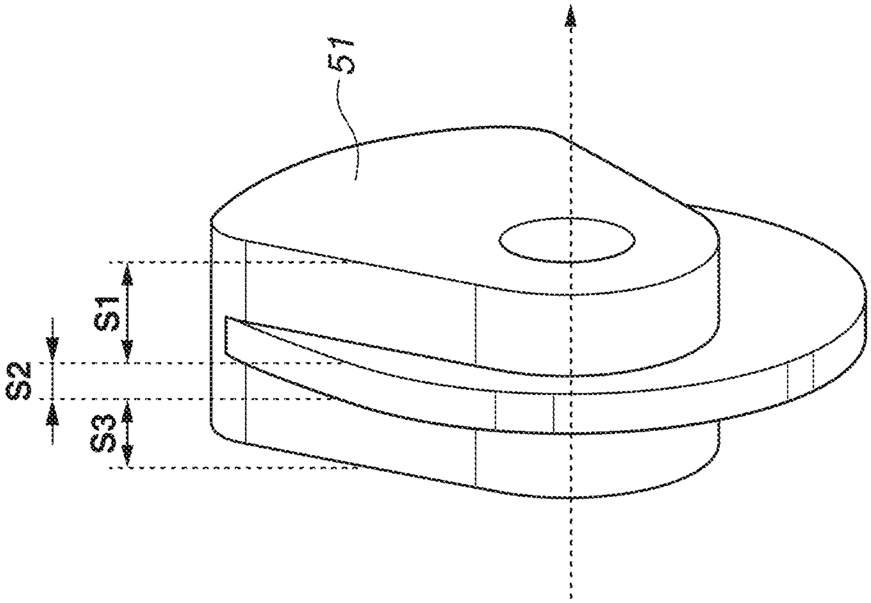

As illustrated in FIGS. 5A and 5B, in the cam 51*d* according to the first exemplary embodiment, a plurality of circumferentially formed cam outer peripheral surfaces is placed at different positions in the rotational axis direction of the cam 51*d*. The cam 51*d*, however, is formed of a unified component, and the plurality of cam outer peripheral surfaces is also referred to as "areas S1, S2, and S3".

The area S2 is an example of a first cam outer peripheral surface, and the areas S1 and S3 are examples of a second cam outer peripheral surface. The shapes of the outer peripheral surfaces of the areas S1 and S3 are the same shape and each include a plurality of outer peripheral surfaces described below.

Each of the areas S1 and S3 includes outer peripheral surfaces L1 to L4. The outer peripheral surface L1 abuts the cam abutment surface 50*d* of the pressurization force variable plate 48*d* in the pressurization state and abuts the cam abutment surface 49*d* in the pressure release state.

The outer peripheral surface L1 includes an area where a distance (hereinafter referred to as "radius") d1 from the center of the cam shaft 52 to the outer peripheral surface L1 is the longest.

The outer peripheral surface L2 abuts the cam abutment surface 50*d* in the pressure release state and is placed on the cam abutment surface 49*d* side in the pressurization state. The outer peripheral surface L2 includes an area where a radius d2 is the shortest.

Each of the outer peripheral surfaces L3 and L4 is an area which is placed between the outer peripheral surfaces L1 and L2 and where the radius d abruptly changes from d1 to d2.

The area S2 is an example of the first cam outer peripheral surface and is interposed between the areas S1 and S3 in the rotational axis direction of the cam shaft 52. The area S2 includes a plurality of outer peripheral surfaces L1 and L5 described below. A cam surface in the area S2 (the first cam outer peripheral surface) abuts the cam abutment surface 50*d* of the pressurization force variable plate 48*d* in the pressurization state and abuts the cam abutment surface 49*d* of the pressurization plate 38*d* in the pressure release state. The outer peripheral surface L1 includes an area where a radius d1 is the longest.

The outer peripheral surface L5 is an area where the radius d is gently changed between lengths in a range where the radius d is longer than d2 and shorter than d1. The outer peripheral surface L5 is an area in the same phase as those of the outer peripheral surfaces L2, L3, and L4. The cam outer peripheral surfaces of the areas S1 to S3 are common to one another in that the cam outer peripheral surfaces include the outer peripheral surface L1. That is, the cam 51*d* includes cam outer peripheral surfaces partially having the same shape.

Cam Abutment Surface According to First Exemplary Embodiment

Figure 6:
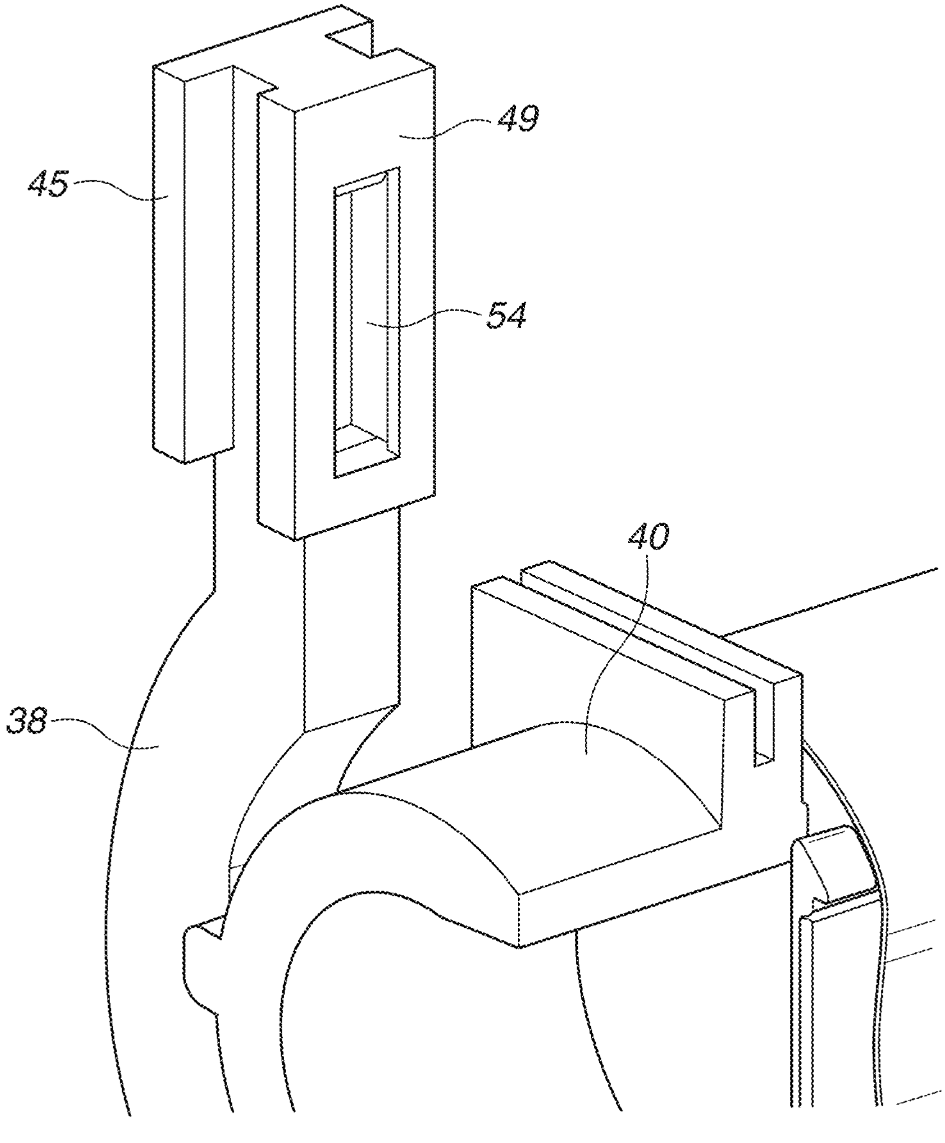
FIG. 6 is a diagram illustrating a shape of a cam abutment surface according to the first exemplary embodiment.

As illustrated in FIG. 6, in the cam abutment surface 49*d* of the pressurization plate 38*d* according to the first exemplary embodiment, a hole portion 54*d* is provided in a range overlapping the area S2 (the first cam outer peripheral surface) in the longitudinal direction among the cam outer peripheral surfaces. The hole portion 54*d* is a form of an action avoidance portion. When the outer peripheral surface L5 rotates to a position overlapping the cam abutment surface 49*d*, the outer peripheral surface L5 fits in the hole portion 54*d*. That is, even though the first cam outer peripheral surface is in a positional relationship where at least a part of the first cam outer peripheral surface overlaps the pressurization plate 38*d* (the first member), the first cam outer peripheral surface does not abut the pressurization plate 38*d* (the first member). Thus, the outer peripheral surface L5 does not act on the cam abutment surface 49*d* of the pressurization plate 38*d*.

Operation of Pressurization Mechanism 35 According to First Exemplary Embodiment Next, with reference to FIGS. 7A to 10, the operation of the pressurization mechanism 35 according to the first exemplary embodiment is described. FIGS. 7A to 10 are operation illustration diagrams illustrating the operation of the pressurization mechanism 35 as seen from the non-driving side. The cam 51*d* rotates counterclockwise. With the rotation of the cam 51*d*, the heating roller 19 switches to the pressure release state, a state 1 in the middle of switching from the pressure release state to the pressurization state, the pressurization state, and a state 2 in the middle of switching from the pressurization state to the pressure release state.

Figure 7B:
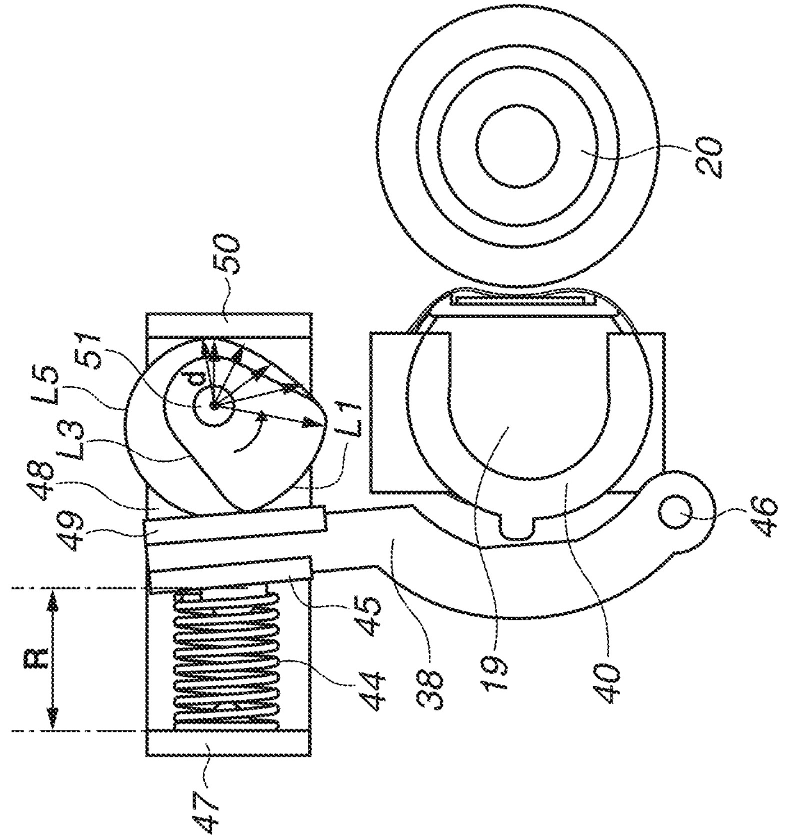
FIGS. 7A and 7B are operation illustration diagrams illustrating a pressure release state of the pressurization mechanism and a state of the pressurization mechanism in middle of transition to a pressurization state according to the first exemplary embodiment.
Figure 7A:
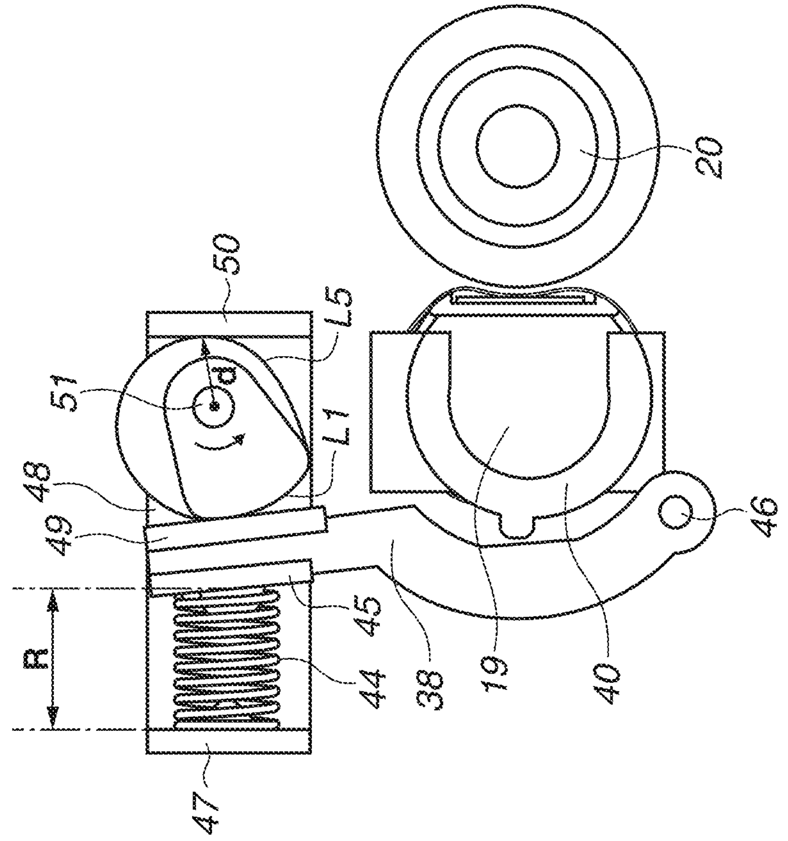

FIG. 7A is a diagram illustrating the pressure release state where the heating roller 19 does not pressurize the pressure roller 20. The pressurization plate 38*d* pivots about the pivot point portion 46*d* as the pivot point, and the pressurization force variable plate 48*d* moves in a sliding manner. With the pressurization force of the pressurization spring 44*d*, the cam abutment surface 49*d* of the pressurization plate 38*d* abuts the outer peripheral surface L1 of the cam 51*d*, and the cam abutment surface 50*d* of the pressurization force variable plate 48*d* abuts a portion where the radius d is shortest on the outer peripheral surface L5 of the cam 51*d*. When the outer peripheral surface L1 of the cam 51*d* is located at the contact position of the outer peripheral surface L1 of the cam 51*d* and the cam abutment surface 49*d* of the pressurization plate 38*d*, the pressurization force of the pressurization spring 44*d* is received by the cam 51*d*, and the pressurization plate 38*d* is located at a position tilted to the left side in FIG. 7A. Thus, the heating roller 19 is located at a position away from the pressure roller 20 and is in the pressure release state where the heating roller 19 does not receive the pressurization force of the pressurization spring 44*d*.

At this time, a distance R between the spring supporting surface 45*d* and the spring supporting surface 47*d* is longest, and the pressurization spring 44*d* expands to the maximum. Thus, the pressurization force of the pressurization spring 44*d* is the minimum.

Although, in the present exemplary embodiment, the state where the pressurization plate 38*d* and the projection portion of the flange 40*d* are away from each other is illustrated, the pressurization plate 38*d* and the projection portion of the flange 40*d* may abut each other so long as the heating roller 19 is in the state where the heating roller 19 does not pressurize the pressure roller 20.

FIG. 7B is a diagram illustrating the state 1 in the middle of transition from the pressure release state to the pressurization state. The abutment of the cam abutment surface 49*d* of the pressurization plate 38*d* to the cam outer peripheral surfaces switches from the outer peripheral surface L1 to the outer peripheral surface L3. The outer peripheral surface L5 where the radius d is longer than that of the outer peripheral surface L3 fits in the hole portion 54*d* of the cam abutment surface 49*d* as an example of the action avoidance portion of the pressurization plate 38*d*, and therefore does not abut and act on the cam abutment surface 49*d*.

On the other hand, in the abutment of the cam abutment surface 50*d* of the pressurization force variable plate 48*d* to the cam outer peripheral surfaces, the cam abutment surface 50*d* abuts the outer peripheral surface L1 while continuously abutting a surface where the radius d gradually becomes longer on the outer peripheral surface L5. At this time, according to the profile of the cam outer peripheral surface L5 where the radius d gradually becomes longer, the distance R between the spring supporting surface 45*d* and the spring supporting surface 47*d* is changed to gradually become shorter, and the pressurization force of the pressurization spring 44*d* gradually becomes greater.

Since this switching is performed in the direction in which the pressurization force gradually becomes greater, the pressurization spring 44*d* is not released at once, and the cam 51*d* is not pushed at once, either. Thus, a hitting sound due to a collision in a driving unit is not generated by the preceding rotation of the cam 51*d*.

Further, the cam 51*d* abuts both the cam abutment surface 49*d* and the cam abutment surface 50*d*, and it is also possible to expect the effect of causing the rotational force torques of the cam 51*d* to cancel out each other by the pressurization force, thereby reducing the preceding rotation of the cam 51*d* and reducing a hitting sound due to a collision in the driving unit.

In FIGS. 7A and 7B, since the cam abutment surface 49*d* and the outer peripheral surface of the cam 51*d* are still at the contact position, the pressurization force of the pressurization spring 44*d* is received by the cam 51*d*. The heating roller 19 is located at a position away from the pressure roller 20 and therefore remains in the pressure release state. If the cam 51*d* further rotates from this state, the heating roller 19 abuts the pressure roller 20, the cam abutment surface 49*d* and the outer peripheral surface of the cam 51*d* separate from each other, and the heating roller 19 starts pressurizing the pressure roller 20.

Figure 8B:
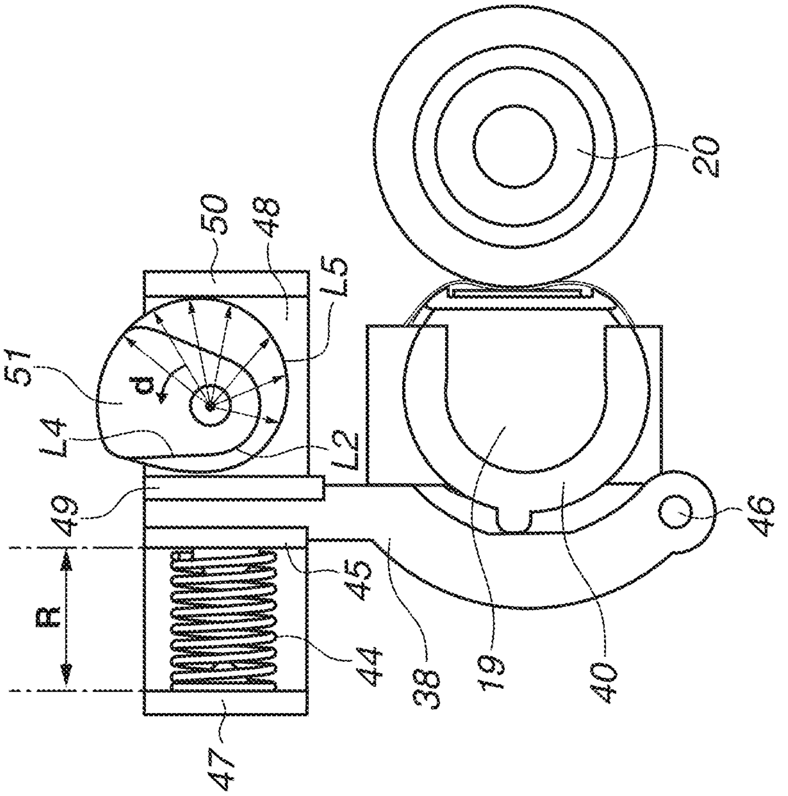
FIGS. 8A and 8B are operation illustration diagrams illustrating the pressurization state of the pressurization mechanism and a state of the pressurization mechanism in middle of transition to the pressure release state according to the first exemplary embodiment.
Figure 8A:
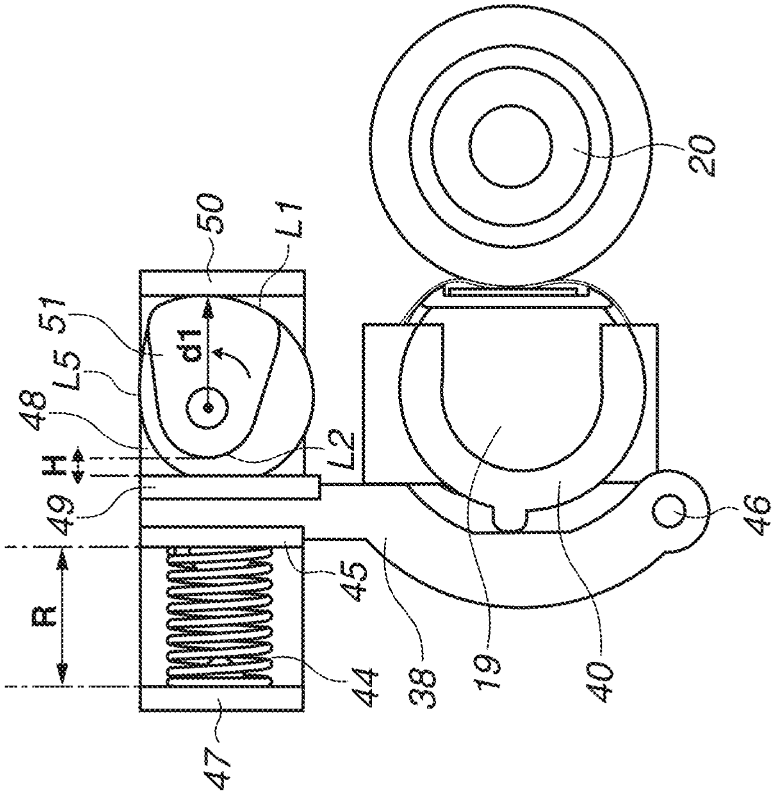
Figure 9:
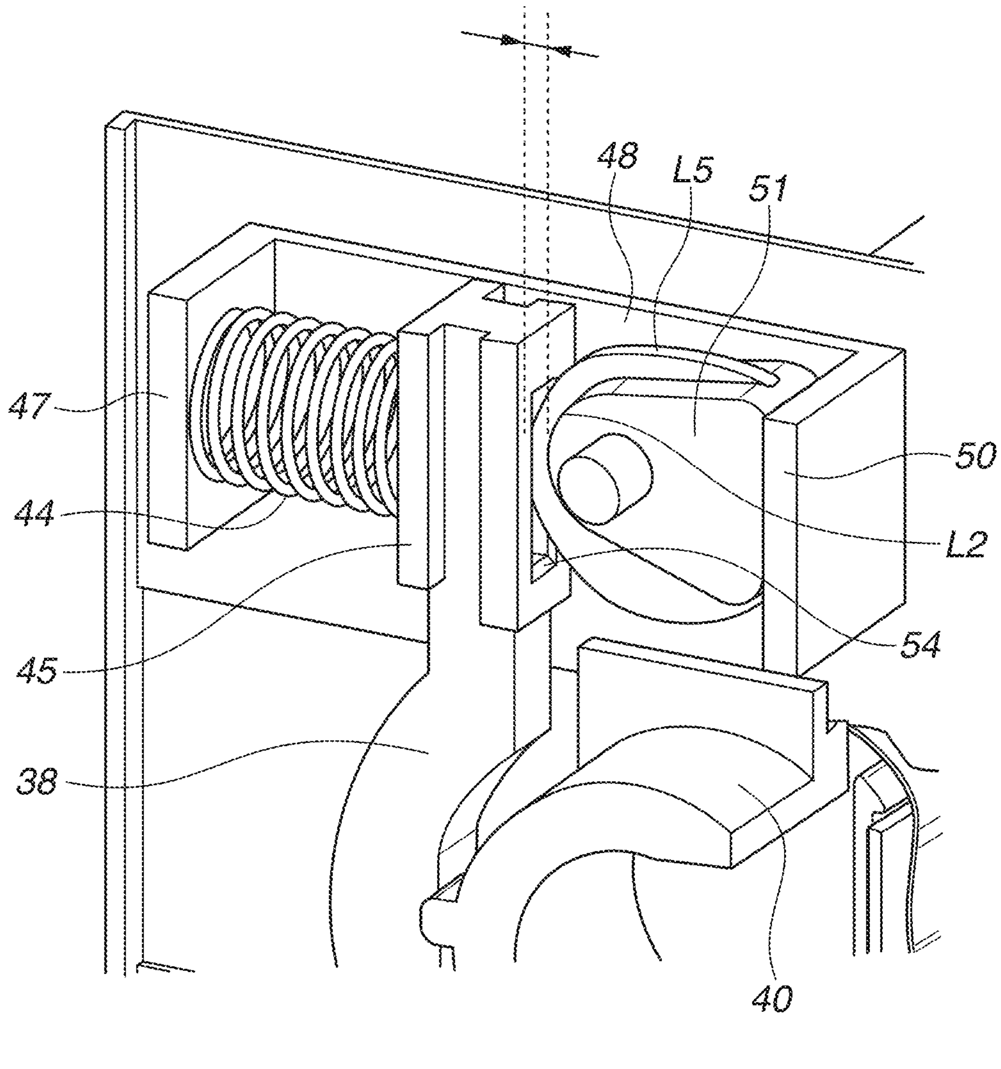
FIG. 9 is a perspective view illustrating the pressurization state of the pressurization mechanism according to the first exemplary embodiment.

FIG. 8A is a diagram illustrating the pressurization state where the heating roller 19 pressurizes the pressure roller 20. The cam abutment surface 50*d* of the pressurization force variable plate 48*d* abuts the outer peripheral surface L1 of the cam 51*d*. In the cam abutment surface 49*d* of the pressurization plate 38*d*, as illustrated in FIG. 9, the outer peripheral surface L5 of the cam 51*d* fits in the hole portion 54*d*. Thus, the cam 51*d* abuts the pressurization plate 38*d* and receives the pressurization force generated by the pressurization spring 44*d*. This avoids the situation where the pressurization force is not sufficiently transmitted to the heating roller 19.

The cam abutment surface 49*d* of the pressurization plate 38*d* is away from the outer peripheral surface L2 at a certain distance H and is in the state where the cam abutment surface 49*d* does not abut the cam outer peripheral surface. When the outer peripheral surface of the cam 51*d* is located at a position away from the cam abutment surface 49*d*, the pressurization force of the pressurization spring 44*d* is received by the flange 40*d* via the pressurization plate 38*d*, and the heating roller 19 is in the state where the heating roller 19 applies the pressurization force of the pressurization spring 44*d* to the pressure roller 20 (the pressurization state).

At this time, the distance R between the spring supporting surface 45*d* and the spring supporting surface 47*d* is shortest, and the pressurization spring 44*d* contracts most. Thus, the pressurization force of the pressurization spring 44*d* is the maximum.

FIG. 8B illustrates the state 2 in the middle of transition from the pressurization state to the pressure release state. The outer peripheral surface L5 of the cam 51*d* is in the hole portion 54*d*, the cam abutment surface 49*d* of the pressurization plate 38*d* is away from the outer peripheral surfaces L2 and L4 at certain distances, and the cam abutment surface 49*d* is in the state where the cam abutment surface 49*d* does not abut the cam outer peripheral surfaces.

In the abutment of the cam abutment surface 50*d* to the cam outer peripheral surfaces, the cam abutment surface 50*d* continues abutting a surface where the radius d gently and slowly becomes shorter on the outer peripheral surface L5. Then, the cam abutment surface 50*d* transitions to a portion where the radius d is shortest. At this time, according to the profile of the cam outer peripheral surface L5 where the radius d gently and slowly becomes shorter, the distance R between the spring supporting surface 45*d* and the spring supporting surface 47*d* is changed in the direction of slowly becoming longer. Thus, the pressurization force of the pressurization spring 44*d* slowly becomes smaller.

In this switching, the distance R is gently and slowly changed, although in the direction in which the pressurization force becomes smaller. Thus, the pressurization spring 44*d* is not released at once, and the cam 51*d* is not pushed at once, either. Thus, a hitting sound due to a collision in the driving unit is not generated by the preceding rotation of the cam 51*d*.

In FIGS. 8A and 8B, the cam abutment surface 49*d* and the outer peripheral surfaces of the cam 51*d* are still away from each other, and the heating roller 19 remains in the state where the heating roller 19 pressurizes the pressure roller 20. If the cam 51*d* further rotates from this state, the cam abutment surface 49*d* and the outer peripheral surface L4 of the cam 51*d* start abutting each other, the pressurization force of the pressurization spring 44*d* is received by the cam 51*d*, and the heating roller 19 transitions to the pressure release state where the heating roller 19 does not pressurize the pressure roller 20.

In the cam 51*d* according to the present exemplary embodiment, the outer peripheral surfaces of the cam 51*d* are formed of the circular arc portions L1 to L5, whereby, even if the angle of rotation deviates due to an error in the angle of rotation of the cam 51*d* in the ranges of the arc lengths of the circular arc portions L1 to L5, the positions of two components, namely the pressurization plate 38*d* and the pressurization force variable plate 48*d*, are configured to not change. It is also possible that the error is absorbed by the distance from a motor that rotationally drives the cam 51*d*, rotational rattling due to backlash in a driving gear train that transmits the rotation of an output shaft of the motor to the cam 51*d*, or small torsion of the cam shaft 52.

Figure 10:
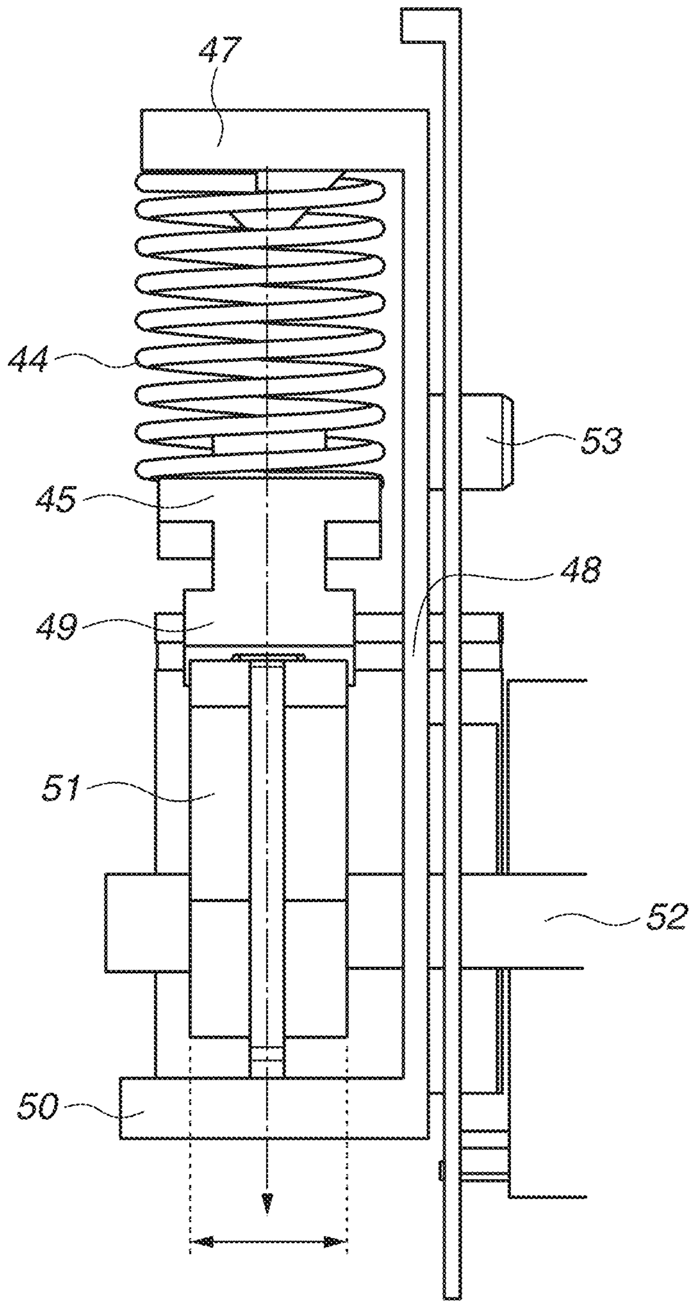
FIG. 10 is a diagram illustrating a positional relationship between a pressurization spring and the cam of the pressurization mechanism according to the first exemplary embodiment.

In the relative positional relationship between the pressurization spring 44*d* and the cam 51*d* according to the present exemplary embodiment, as illustrated in FIG. 10, the cam 51*d* is placed in a range on the winding central axis of the pressurization spring 44*d*. Thus, the cam 51*d* can receive a great pressurization force from the pressurization spring 44*d* at its center-of-gravity position.

That is, a configuration is employed in which it is possible to reduce the risk that the cam 51*d* tilts by receiving a pressurization force, and the frame body itself strains due to the tilt.

Effects of First Exemplary Embodiment

As described above, based on the pressurization mechanism 35 according to the first exemplary embodiment, it is possible to reduce an impact sound due to the preceding rotation of the cam 51*d* both at the timing when a pressure release state transitions to a pressurization state and at the timing when the pressurization state transitions to the pressure release state. Further, based on the pressurization mechanism 35 according to the first exemplary embodiment, it is possible to reduce the loss of the pressurization force of a pressurization member in a pressurization state.

Description of Examples of Other Configurations of Pressurization Mechanism

In the components described in the first exemplary embodiment, similar effects can also be obtained using other configurations. The other configurations are described below.

Pressurization Spring-Tension Spring

Figure 11B:
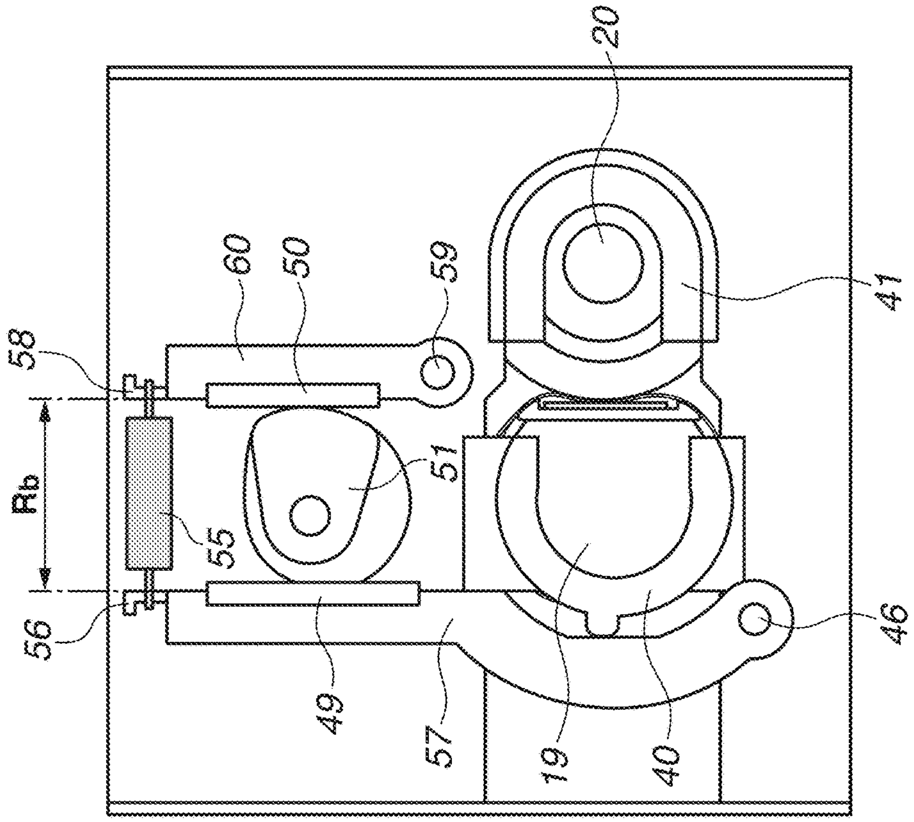
FIGS. 11A and 11B are side views illustrating a configuration of the pressurization mechanism including a pressurization spring in another example according to the first exemplary embodiment.
Figure 11A:
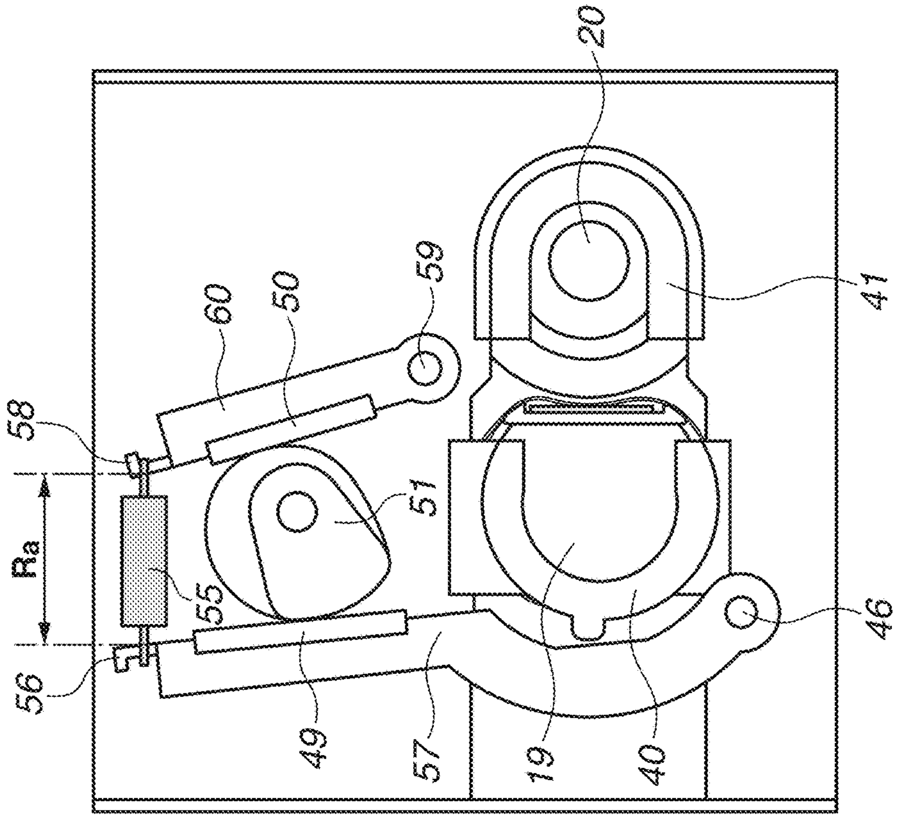

Although the pressurization mechanism 35 using the pressurization member swingable with a compression spring and the pressurization force variable plate 48*d* has been described with reference to FIGS. 7A to 9, the present exemplary embodiment is not limited to this. FIGS. 11A and 11B illustrate an example of another configuration of the pressurization mechanism 35.

As illustrated in FIGS. 11A and 11B, the pressurization mechanism 35 includes a pressurization spring 55 constituted by a tension spring that, when it is pulled at its both end portions, generates a tensile force (a pressurization force) in the direction of contracting. The pressurization spring 55 is disposed parallel to the moving direction of the heating roller 19 downstream of the nip portion N in the conveyance direction of the recording material.

The pressurization mechanism 35 also includes a pressurization plate 57 including at its one end a hook portion 56 on which one end of the pressurization spring 55 is hooked, and a pivot point portion 46 as a pivot point about which the pressurization plate 57 pivots at the other end. Further, similarly to the pressurization plate 57, the pressurization mechanism 35 includes a pressurization force variable plate 60 including at its one end a hook portion 58 on which the other end of the pressurization spring 55 is hooked, and a pivot point portion 59 as a pivot point about which the pressurization force variable plate 60 pivots at the other end.

In this configuration, in a pressure release state illustrated in FIG. 11A, a length Ra of a pressurization spring 55*d* constituted by a tension spring is shortest, whereby the pressurization force is the minimum. In a pressurization state (FIG. 11B), a length Rb of the pressurization spring 55*d* constituted by a tension spring is longest, whereby the pressurization force is the maximum.

With the above configuration, the shape of a cam and the shapes of cam abutment surfaces similar to those in the present exemplary embodiment are set, whereby it is also possible to obtain similar actions and effects using this pressurization mechanism 35.

Pressurization Spring-Torsion Spring

Figure 12B:
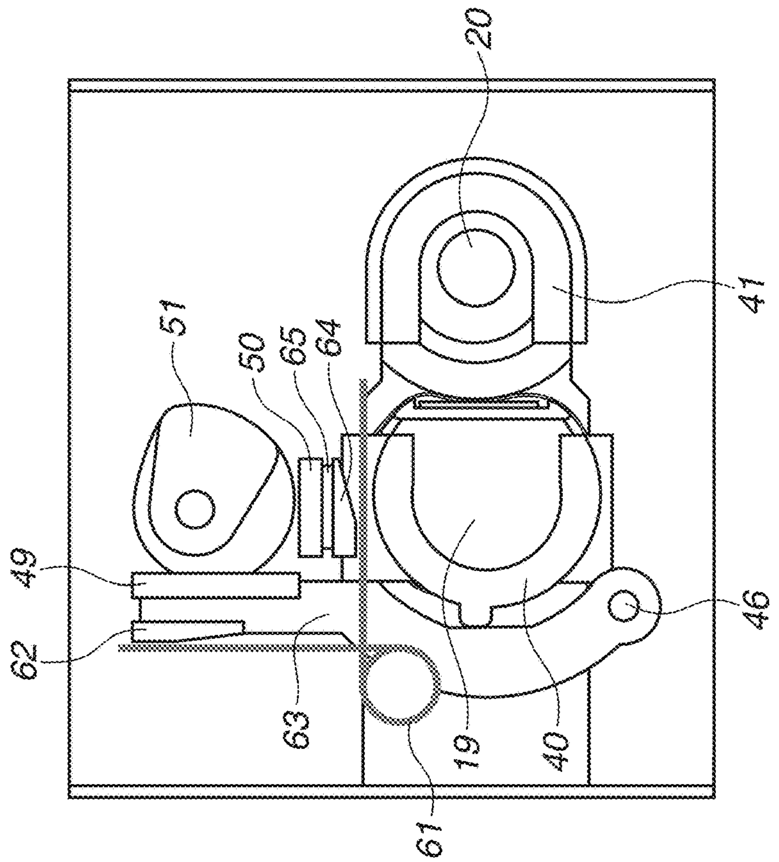
FIGS. 12A and 12B are side views illustrating a configuration of the pressurization mechanism including a pressurization spring in another example according to the first exemplary embodiment.
Figure 12A:
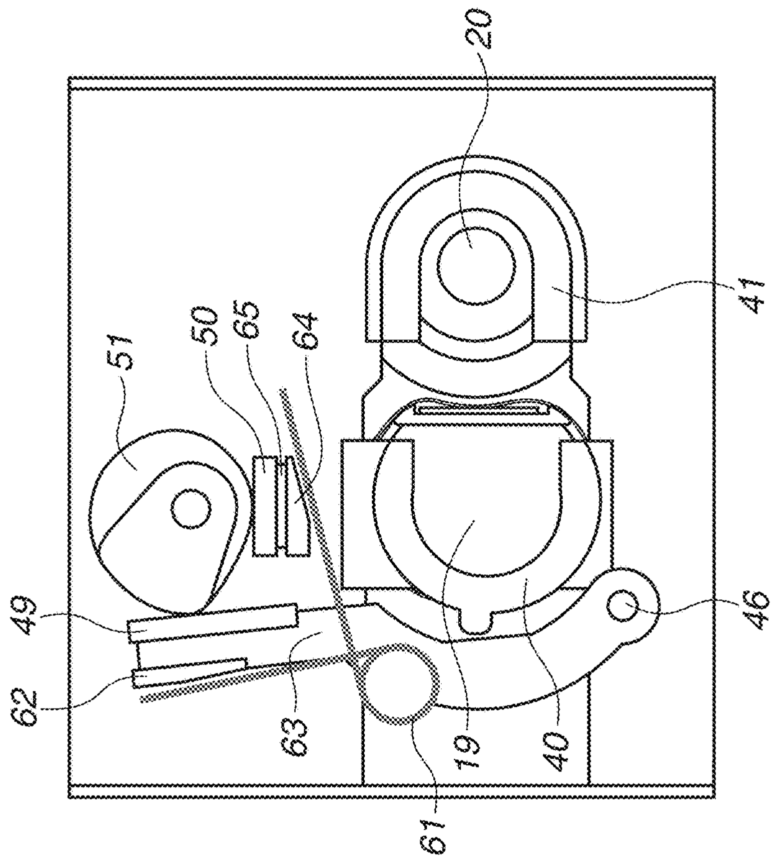

Although the pressurization mechanism 35 using the pressurization member swingable with a compression spring and the pressurization force variable plate 48*d* has been described with reference to FIGS. 7A to 9, the present exemplary embodiment is not limited to this. FIGS. 12A and 12B illustrate an example of another configuration.

As illustrated in FIGS. 12A and 12B, the pressurization mechanism 35 includes a pressurization spring 61*d* constituted by a torsion spring that generates a pressurization force in the direction of twisting back. The pressurization spring 61*d* is disposed downstream of the nip portion N in the conveyance direction of the recording material.

The pressurization mechanism 35 also includes a pressurization plate 63*d* including at its one end a spring supporting surface 62*d* that abuts and supports the pressurization spring 61*d*, and a pivot point portion 46*d* as a pivot point about which the pressurization plate 63*d* pivots at the other end. Further, similarly to the pressurization plate 63*d*, the pressurization mechanism 35 includes a pressurization force variable plate 65*d* including a spring supporting surface 64*d* that abuts and supports the other end of the pressurization spring 61*d* and capable of moving in a sliding manner.

In this configuration, unlike the configurations of the other pressurization springs, the pressurization plate 63*d* and the pressurization force variable plate 65*d* are not placed to be opposed to each other across the cam 51*d*. Moreover, the pressurization force variable plate 65*d* can be made compact, and therefore, the degree of freedom in arrangement improves.

In this configuration, in a pressure release state illustrated in FIG. 12A, the pressurization spring 61*d* constituted by a torsion spring is most opened, whereby the pressurization force is the minimum. In a pressurization state illustrated in FIG. 12B, the pressurization spring 61*d* constituted by a torsion spring is most twisted and tightened, whereby the pressurization force is the maximum.

With the above configuration, the shape of a cam and the shapes of cam abutment surfaces similar to those in the present exemplary embodiment are set, whereby it is also possible to obtain similar actions and effects using this pressurization mechanism 35.

Cam and Spring Supporting Surface A

Although the pressurization mechanism 35 using a spring supporting surface A in which the hole portion 54*d* is provided has been described with reference to FIGS. 7A to 9, the present exemplary embodiment is not limited to this. FIGS. 13A, 13B, 14A, and 14B illustrate an example of another configuration.

Shape of Cam

Figure 13B:
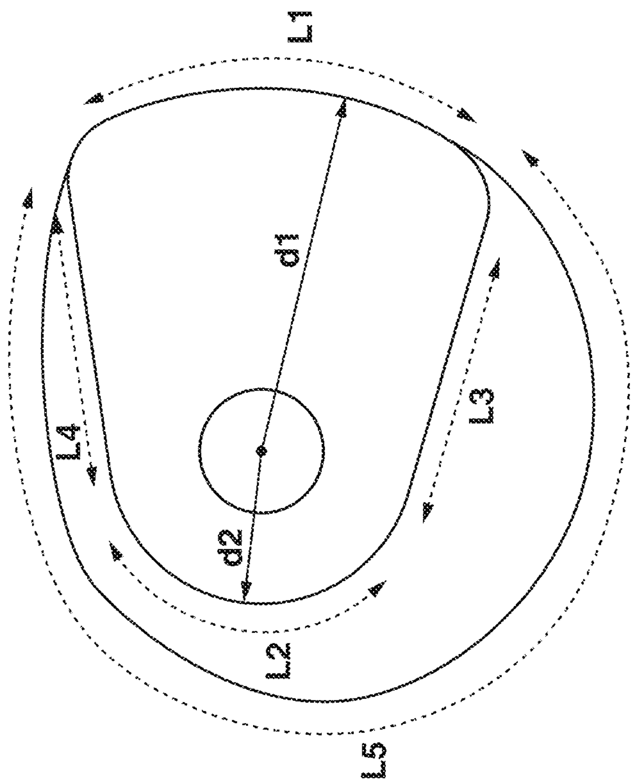
FIGS. 13A and 13B are diagrams illustrating a shape of a cam in another example according to the first exemplary embodiment.
Figure 13A:
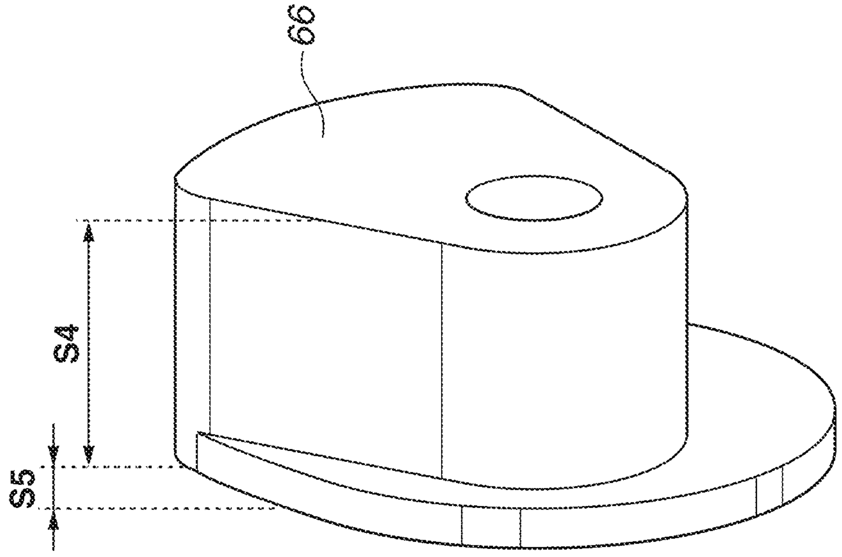

As illustrated in FIGS. 13A and 13B, a cam 66 includes different outer peripheral surfaces in areas S4 and S5 different from each other in the rotational axis direction of the cam 66. The shape of the outer peripheral surface of the area S4 includes a plurality of outer peripheral surfaces described below.

That is, an outer peripheral surface L1 abuts the cam abutment surface 50*d* of the pressurization force variable plate 48*d* in the pressurization state and abuts the cam abutment surface 49*d* of the pressurization plate 38*d* in the pressure release state. The outer peripheral surface L1 includes a portion where a radius d1 is the longest.

An outer peripheral surface L2 abuts the cam abutment surface 50*d* of the pressurization force variable plate 48*d* in the pressure release state and is placed on the cam abutment surface 49*d* side of the pressurization plate 38*d* in the pressurization state. The outer peripheral surface L2 includes a portion where a radius d2 is the shortest.

Each of outer peripheral surfaces L3 and L4 is an outer peripheral surface which is located between the outer peripheral surfaces L1 and L2 and where the radius d abruptly changes from d1 to d2.

On the other hand, the shape of the outer peripheral surface in the area S5 includes a plurality of outer peripheral surfaces described below.

That is, an outer peripheral surface L1 abuts the cam abutment surface 50*d* in the pressurization state and abuts the cam abutment surface 49*d* in the pressure release state. The outer peripheral surface L1 includes an outer peripheral surface where a radius d1 is the longest.

An outer peripheral surface L5 is an area where the radius d is gently changed between lengths in a range where the radius d is longer than d2 and shorter than d1. The outer peripheral surface L5 is an area in the same phase as those of the outer peripheral surfaces L2, L3, and L4.

Cam Abutment Surface A

Figure 14B:
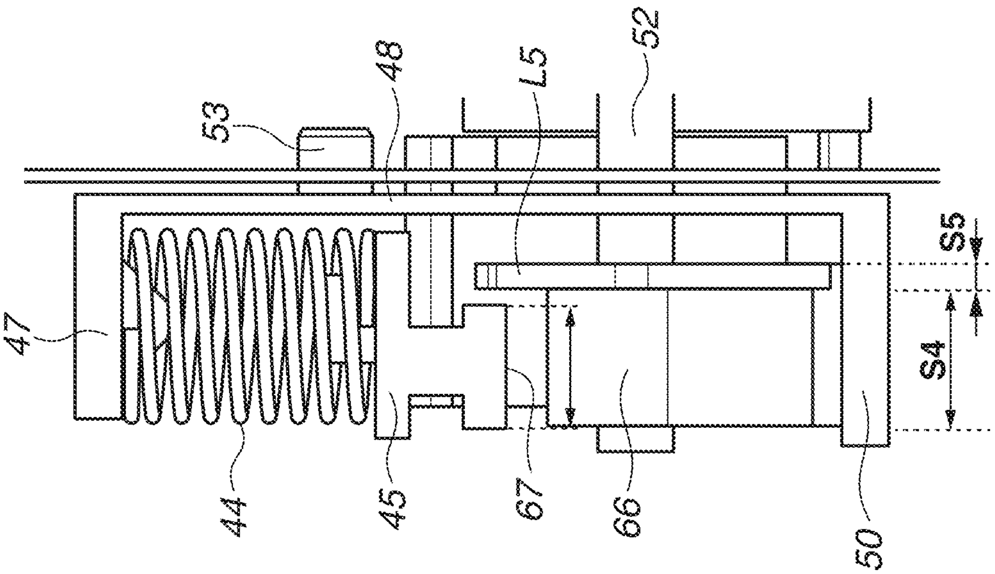
FIGS. 14A and 14B are diagrams illustrating a positional relationship between the cam and a cam abutment surface in another example of the pressurization mechanism according to the first exemplary embodiment.
Figure 14A:
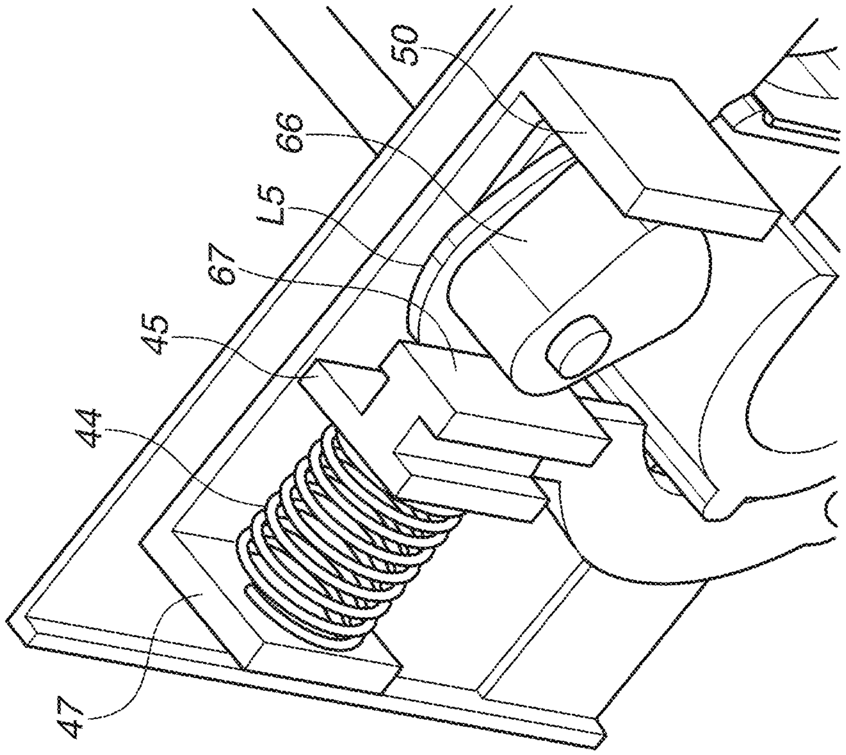

As illustrated in FIGS. 14A and 14B, a cam abutment surface 67 is placed at a position that overlaps the area S4 in the longitudinal direction among the cam outer peripheral surfaces in the longitudinal direction, but does not overlap the area S5 in the longitudinal direction. Thus, also when the outer peripheral surface L5 rotates to the cam abutment surface 67 side, the outer peripheral surface L5 does not overlap the cam abutment surface 67 in the longitudinal direction. Thus, the outer peripheral surface L5 does not abut and act on the cam abutment surface 67.

It is also possible to obtain similar actions and effects using the pressurization mechanism 35 having the above configuration. With this configuration, it is not necessary to provide an escape hole in the cam abutment surface 67. With this configuration, a cam does not necessarily need to be formed of a unified component, and it is also possible to obtain similar actions and effects with a configuration in which two cams, namely a cam 1 having the shape of the outer peripheral surface of the area S4 in the longitudinal direction and a cam 2 having the shape of the outer peripheral surface of the area S5 in the longitudinal direction, are provided.

Pressurization Plate

Figure 15B:
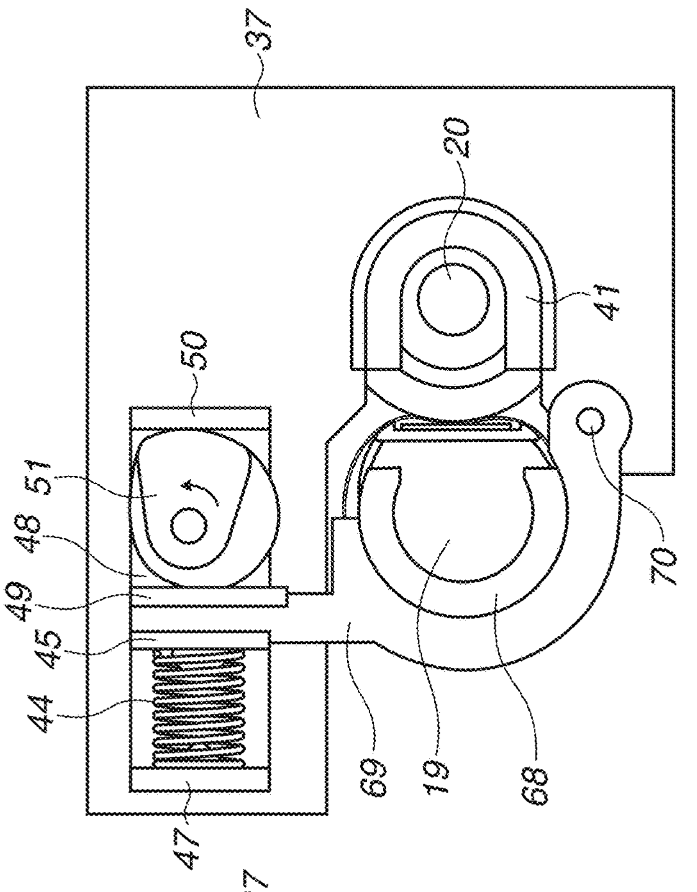
FIGS. 15A and 15B are side views illustrating a pressurization plate in another example of the pressurization mechanism according to the first exemplary embodiment.
Figure 15A:
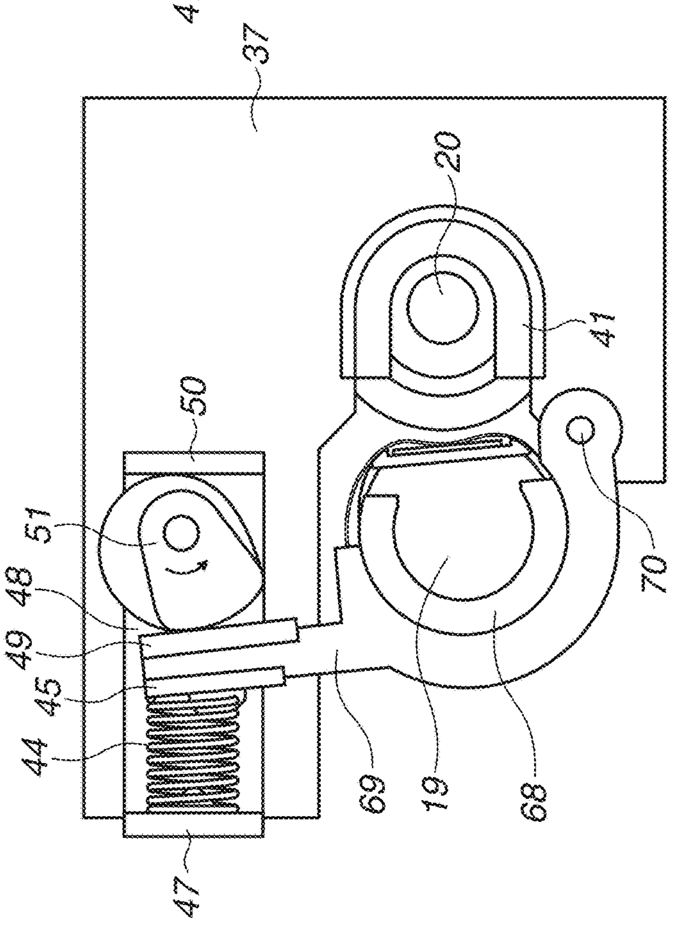

In FIGS. 7A to 9, an example has been described where the pressurization plate 38*d* pivotally moves about the pivot point portion 46*d* as the pivot point and presses or separates from the projection portion of the flange 40*d*. Consequently, the heating roller 19 moves in a sliding manner relative to the pressure roller 20, thereby coming close to or moving away from the pressure roller 20 and switching between the pressurization state and the pressure release state. The present exemplary embodiment, however, is not limited to this. FIGS. 15A and 15B illustrate an example of another configuration.

As illustrated in FIGS. 15A and 15B, the heating roller 19 is supported on a flange 68*d* by a pressurization plate 69*d*. The pressurization plate 69*d* pivots about a fixed shaft 70*d* of the frame 37 as a pivot point so that the heating roller 19 can pressurize the pressure roller 20.

The pressurization plate 69*d* pivotally moves about the fixed shaft 70*d* as the pivot point. With this pivotal movement, the heating roller 19 also pivots together with the pressurization plate 69*d* supporting the flange 68*d*. Consequently, the heating roller 19 comes close to or moves away from the pressure roller 20, thereby switching between a pressurization state (FIG. 15B) and a pressure release state (FIG. 15A).

It is also possible to obtain similar actions and effects using the pressurization mechanism 35 having the above configuration. Moreover, with this configuration, the position of the pivotal center of the pressurization plate 69*d* and the placement of the pressurization spring 44*d* are adjusted, whereby it is possible to increase the degree of freedom in achieving optimal pressurization distribution in a nip having a predetermined width.

Next, with reference to FIGS. 16A to 19, the configuration of a pressurization mechanism according to a second exemplary embodiment is described. The pressurization mechanism 35 according to the second exemplary embodiment is different from that according to the first exemplary embodiment in that in addition to the pressurization state and the pressure release state, the pressurization mechanism 35 according to the second exemplary embodiment has a light pressurization state where the pressurization force is smaller than in the pressurization state. In the present exemplary embodiment, portions similar to those in the first exemplary embodiment are not described.

Shape of Cam According to Second Exemplary Embodiment

Figure 16B:
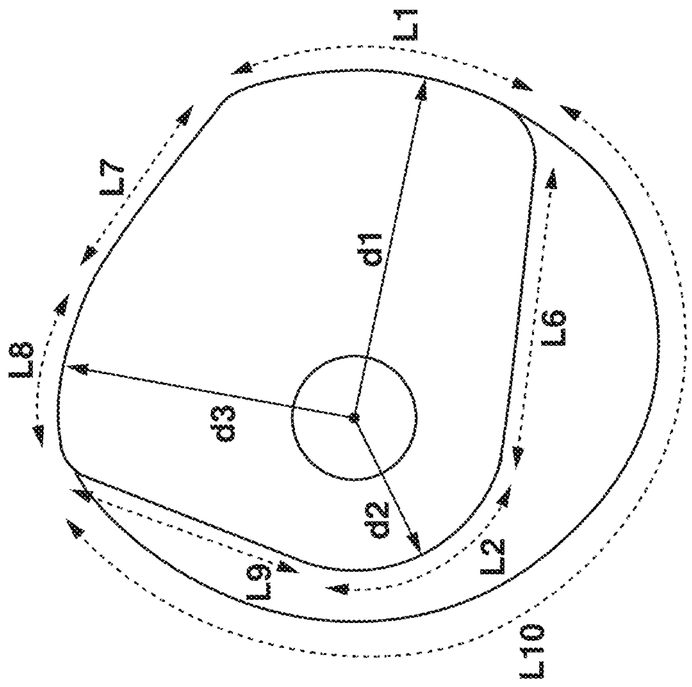
FIGS. 16A and 16B are diagrams illustrating a shape of a cam according to a second exemplary embodiment.
Figure 16A:
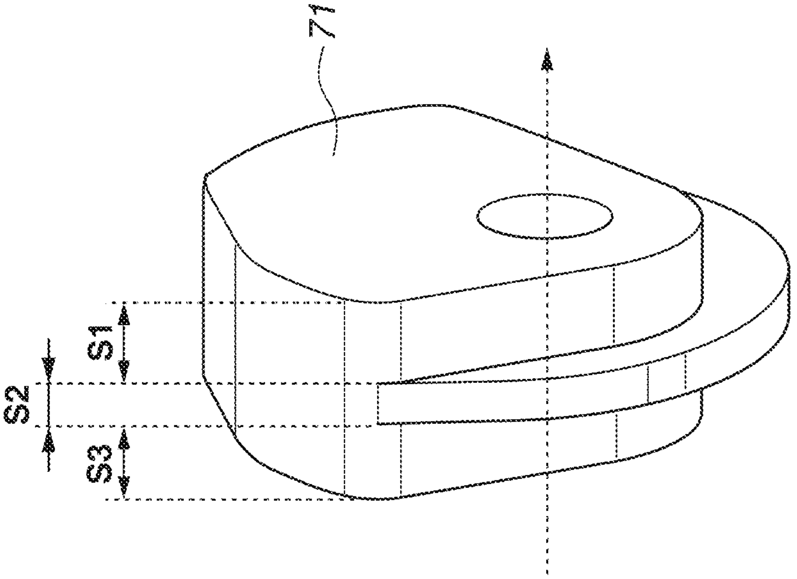

As illustrated in FIGS. 16A and 16B, a cam 71*d* according to the second exemplary embodiment includes areas S1, S2, and S3 different from each other in the rotational axis direction of the cam 71*d*. The shapes of the outer peripheral surfaces of the areas S1 and S3 are the same shape and each include a plurality of outer peripheral surfaces described below.

An outer peripheral surface L1 is an outer peripheral surface that abuts the cam abutment surface 50*d* in the pressurization state, abuts the cam abutment surface 49*d* in the pressure release state, and includes an area where a radius d1 is the longest. An outer peripheral surface L2 is an outer peripheral surface that abuts the cam abutment surface 50*d* in the pressure release state, is placed on the cam abutment surface 49*d* side in the pressurization state, and includes an area where a radius d2 is the shortest. An outer peripheral surface L6 is an outer peripheral surface which is placed between the outer peripheral surfaces L1 and L2 and where the radius d abruptly changes from d1 to d2. An outer peripheral surface L7 is an outer peripheral surface which is adjacent to the outer peripheral surface L1 and where the radius d gradually becomes smaller. An outer peripheral surface L8 is an outer peripheral surface which is adjacent to the outer peripheral surface L7 and includes an area where a radius d3 is smaller than the radius d1. An outer peripheral surface L9 is an outer peripheral surface which is placed between the outer peripheral surfaces L8 and L2 and where the radius d abruptly changes from d3 to d2.

On the other hand, the shape of the outer peripheral surface of the area S2 interposed between the areas S1 and S3 includes a plurality of outer peripheral surfaces described below.

An outer peripheral surface L1 is an outer peripheral surface that abuts the cam abutment surface 50*d* in the pressurization state, abuts the cam abutment surface 49*d* in the pressure release state, and includes an area where a radius d1 is the longest. An outer peripheral surface L7 is an outer peripheral surface which is adjacent to the outer peripheral surface L1 and where the radius d gradually becomes smaller. An outer peripheral surface L8 is an outer peripheral surface which is adjacent to the outer peripheral surface L7 and includes an area where a radius d3 is smaller than the radius d1.

An outer peripheral surface L10 is an outer peripheral surface which is located between the outer peripheral surfaces L1 and L8 and includes an area where the radius d is gently changed between lengths in a range where the radius d is longer than d2 and shorter than d1. The outer peripheral surface L10 is an area in the same phase as those of the outer peripheral surfaces L2, L6, and L9.

Cam Abutment Surface According to Second Exemplary Embodiment

Similarly to the first exemplary embodiment (see FIG. 6), in the cam abutment surface 49*d* according to the second exemplary embodiment, a hole portion 54*d* is provided in a range overlapping the area S2 in the longitudinal direction among the cam outer peripheral surfaces. Thus, when the outer peripheral surface L10 rotates to a position overlapping the cam abutment surface 49*d*, the outer peripheral surface L10 also fits in the hole portion 54*d*. Thus, the outer peripheral surface L10 does not abut and act on the cam abutment surface 49*d*.

Operation of Pressurization Mechanism 35 According to Second Exemplary Embodiment With reference to FIGS. 17A to 19, the operation of the pressurization mechanism 35 according to the second exemplary embodiment is described. FIGS. 17A to 19 are operation illustration diagrams illustrating the operation of the pressurization mechanism 35 from the non-driving side.

Figure 17B:
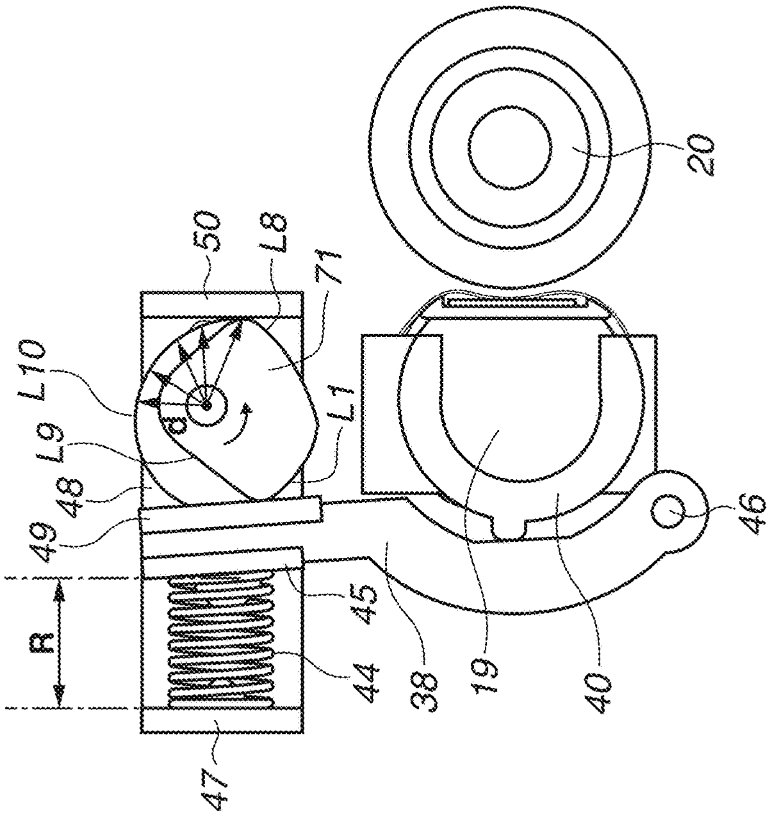
FIGS. 17A and 17B are operation illustration diagrams illustrating a pressure release state of a pressurization mechanism and a state of the pressurization mechanism in middle of transition to a pressurization state according to the second exemplary embodiment.
Figure 17A:
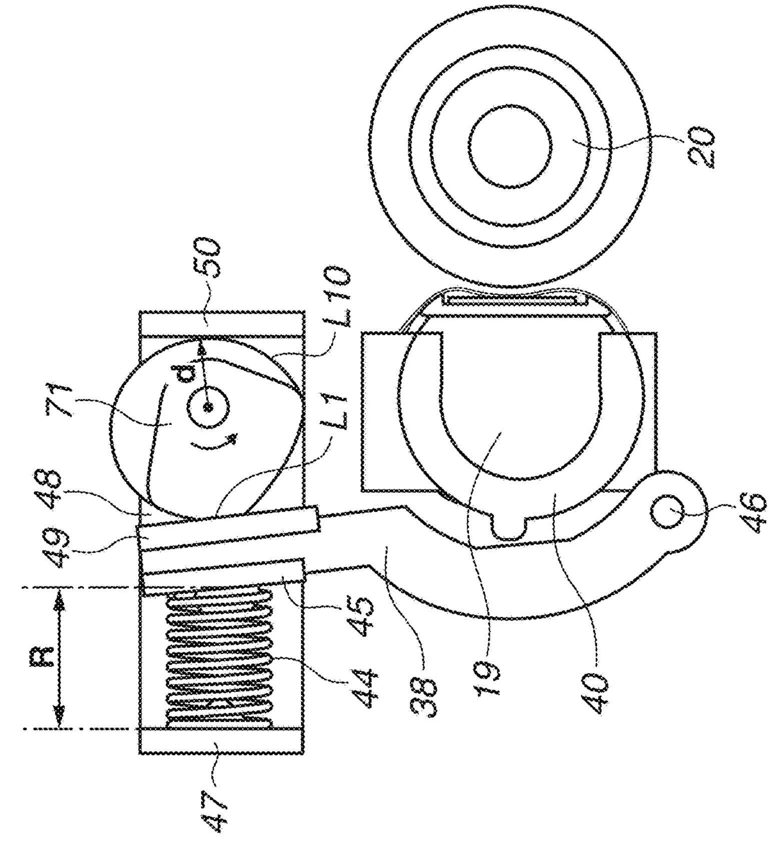

FIG. 17A illustrates the pressure release state where the heating roller 19 does not pressurize the pressure roller 20. The pressurization plate 38*d* pivots about the pivot point portion 46*d* as the pivot point, and the pressurization force variable plate 48*d* also moves in a sliding manner with this pivot. With the pressurization force of the pressurization spring 44*d*, the cam abutment surface 49*d* of the pressurization plate 38*d* abuts the outer peripheral surface L1 of the cam 71*d*, and the cam abutment surface 50*d* of the pressurization force variable plate 48*d* abuts a portion where the radius d is shortest on the outer peripheral surface L10 of the cam 71*d*. When the outer peripheral surface L1 of the cam 71*d* is located at the contact position of the outer peripheral surface L1 of the cam 71*d* and the cam abutment surface 49*d*, the pressurization force of the pressurization spring 44*d* is received by the cam 71*d*, and the pressurization plate 38*d* is located at a position tilted to the left side in FIG. 17A. Thus, the heating roller 19 is located at a position away from the pressure roller 20 and is in the pressure release state where the heating roller 19 does not receive the pressurization force of the pressurization spring 44*d*.

At this time, a distance R between the spring supporting surface 45*d* and the spring supporting surface 47*d* is longest, and the pressurization spring 44*d* expands to the maximum. Thus, the pressurization force of the pressurization spring 44*d* is the minimum.

Although in the second exemplary embodiment, the state where the pressurization plate 38*d* and the projection portion of the flange 40*d* are away from each other is illustrated, the pressurization plate 38*d* and the projection portion of the flange 40*d* may abut each other so long as the heating roller 19 is in the state where the heating roller 19 does not pressurize the pressure roller 20.

FIG. 17B illustrates the state in the middle of transition from the pressure release state to the light pressurization state. The abutment of the cam abutment surface 49*d* of the pressurization plate 38*d* to the cam outer peripheral surfaces switches from the outer peripheral surface L1 to the outer peripheral surface L9. The outer peripheral surface L10 where the radius d is longer than that of the outer peripheral surface L9 fits in the hole portion 54*d* of the cam abutment surface 49*d*, and therefore does not abut and act on the cam abutment surface 49*d*.

In the abutment of the cam abutment surface 50*d* to the cam outer peripheral surfaces, the cam abutment surface 50*d* abuts the outer peripheral surface L8 while continuously abutting a surface where the radius d gradually becomes longer on the outer peripheral surface L10. At this time, according to the profile of the cam outer peripheral surface L10 where the radius d gradually becomes longer, the distance R between the spring supporting surface 45*d* and the spring supporting surface 47*d* is changed to gradually become shorter, and the pressurization force of the pressurization spring 44*d* gradually becomes greater.

Since this switching is performed in the direction in which the pressurization force gradually becomes greater, the pressurization spring 44*d* is not released at once, and the cam 71*d* is not pushed at once, either. Thus, a hitting sound due to a collision in a driving unit is not generated by the preceding rotation of the cam 71*d*.

Further, the cam 71*d* abuts both the cam abutment surface 49*d* and the cam abutment surface 50*d*, and it is also possible to expect the effect of causing the rotational force torques of the cam 71*d* to cancel out each other by the pressurization force, thereby reducing the preceding rotation of the cam 71*d* and reducing a hitting sound due to a collision in the driving unit.

In FIGS. 17A and 17B, since the cam abutment surface 49*d* and the outer peripheral surface of the cam 71*d* are still at the contact position, the pressurization force of the pressurization spring 44*d* is received by the cam 71*d*. The heating roller 19 is located at a position away from the pressure roller 20 and therefore remains in the pressure release state. If the cam 71*d* further rotates from this state, the heating roller 19 abuts the pressure roller 20, the cam abutment surface 49*d* and the cam outer peripheral surface separate from each other, and the heating roller 19 starts pressurizing the pressure roller 20.

Figure 18B:
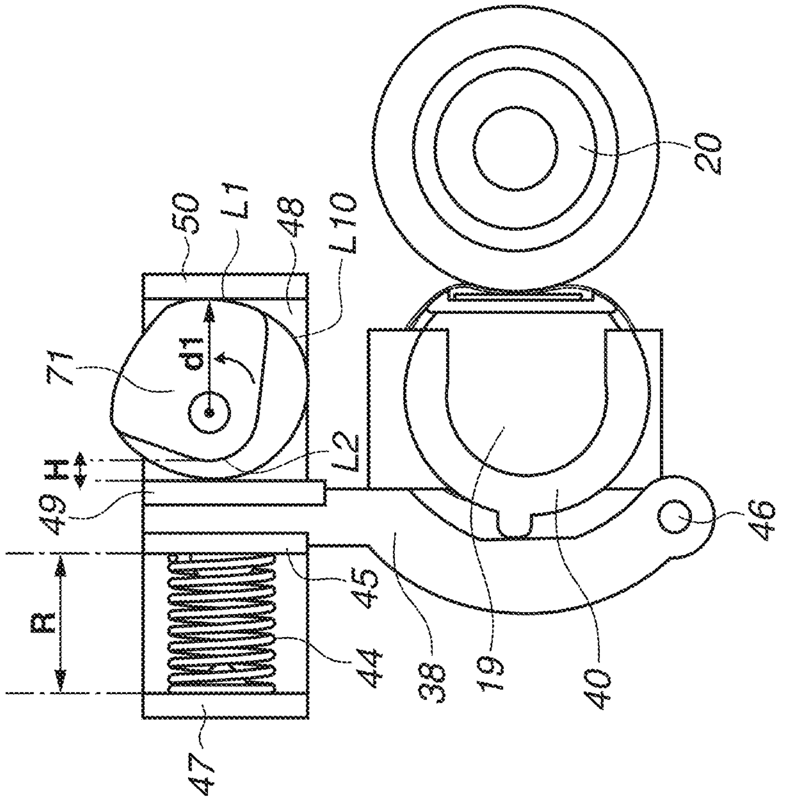
FIGS. 18A and 18B are operation illustration diagrams illustrating a light pressurization state and the pressurization state of the pressurization mechanism according to the second exemplary embodiment.
Figure 18A:
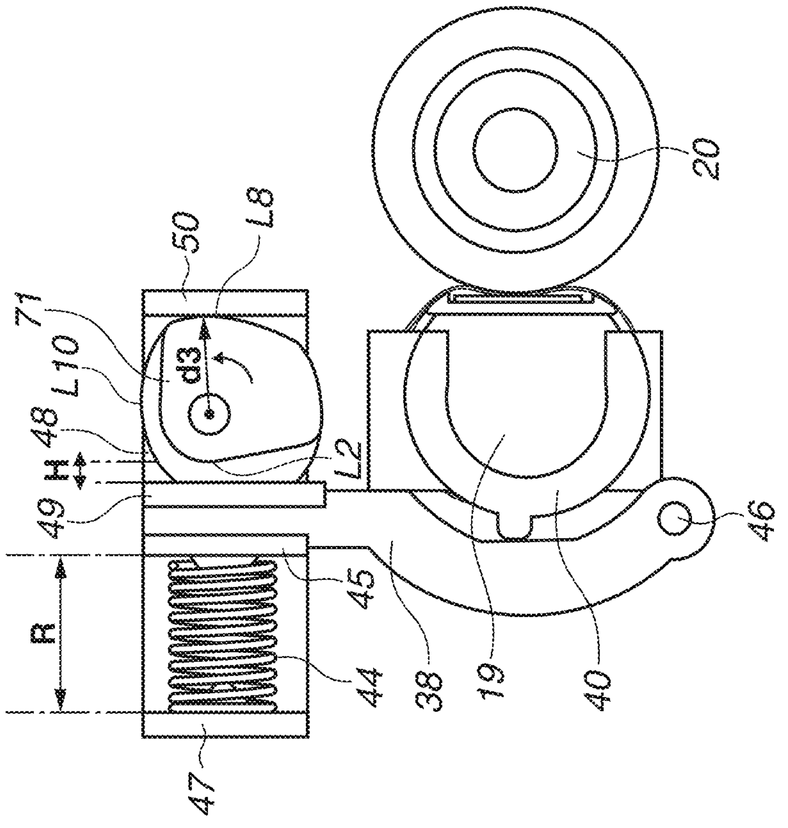

FIG. 18A illustrates the light pressurization state where the heating roller 19 lightly pressurizes the pressure roller 20. The cam abutment surface 50*d* of the pressurization force variable plate 48*d* abuts the outer peripheral surface L8 of the cam 71*d*. In the cam abutment surface 49*d* of the pressurization plate 38*d*, the outer peripheral surface L10 of the cam 71*d* is in the hole portion 54*d*. Thus, the cam 71*d* abuts the pressurization plate 38*d* and receives the pressurization force generated by the pressurization spring 44*d*. This avoids the situation where the pressurization force is not sufficiently transmitted to the heating roller 19. The cam abutment surface 49*d* of the pressurization plate 38*d* is away from the outer peripheral surface L2 at a certain distance H and is in the state where the cam abutment surface 49*d* does not abut the cam outer peripheral surface.

When the outer peripheral surface of the cam 71*d* is located at a position away from the cam abutment surface 49*d*, the pressurization force of the pressurization spring 44*d* is received by the flange 40*d* via the pressurization plate 38*d*, and the heating roller 19 is in the light pressurization state where the heating roller 19 applies the pressurization force of the pressurization spring 44*d* to the pressure roller 20.

FIG. 18B is a diagram illustrating the pressurization state where the heating roller 19 pressurizes the pressure roller 20. The cam abutment surface 50*d* of the pressurization force variable plate 48*d* abuts the outer peripheral surface L1 of the cam 71*d*. The cam abutment surface 49*d* of the pressurization plate 38*d* is very close to the outer peripheral surface L10 of the cam 71*d*, but does not abut the outer peripheral surface L10 because the hole portion 54*d* is present. Thus, the cam 71*d* abuts the pressurization plate 38*d* and receives the pressurization force generated by the pressurization spring 44*d*. This avoids the situation where the pressurization force is not sufficiently transmitted to the heating roller 19. The cam abutment surface 49*d* of the pressurization plate 38*d* is away from the outer peripheral surface L2 at a certain distance H and is in the state where the cam abutment surface 49*d* does not abut the cam outer peripheral surface.

When the outer peripheral surface of the cam 71*d* is located at a position away from the cam abutment surface 49*d*, the pressurization force of the pressurization spring 44*d* is received by the flange 40*d* via the pressurization plate 38*d*, and the heating roller 19 is in the pressurization state where the heating roller 19 applies the pressurization force of the pressurization spring 44*d* to the pressure roller 20.

At this time, the distance R between the spring supporting surface 45*d* and the spring supporting surface 47*d* is shortest, and the pressurization spring 44*d* contracts most. Thus, the pressurization force of the pressurization spring 44*d* is the maximum.

Figure 19:
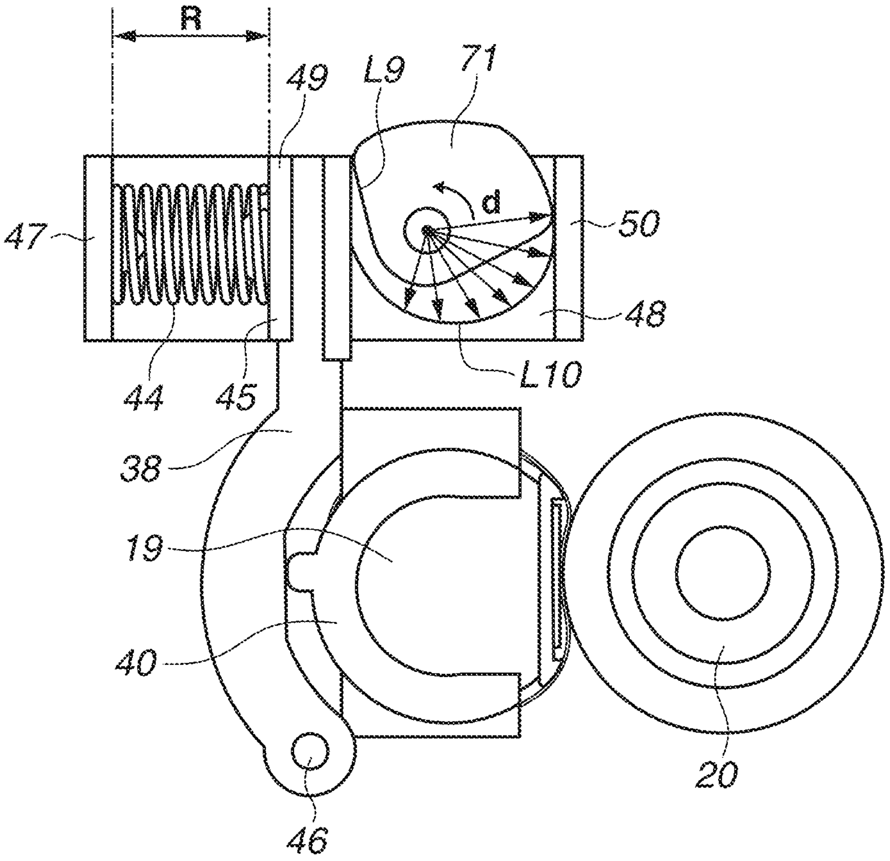
FIG. 19 is an operation illustration diagram illustrating a state of the pressurization mechanism in middle of transition from the pressurization state to the pressure release state according to the second exemplary embodiment.

FIG. 19 illustrates the state in the middle of transition from the pressurization state to the pressure release state. The outer peripheral surface L10 of the cam 71*d* is in the hole portion 54*d*, and the cam abutment surface 49*d* of the pressurization plate 38*d* is in the state where the cam abutment surface 49*d* does not abut the cam outer peripheral surfaces. In the abutment of the cam abutment surface 50*d* to the cam outer peripheral surfaces, the cam abutment surface 50*d* continues abutting a surface where the radius d gently and slowly becomes shorter on the outer peripheral surface L10. Then, the cam abutment surface 50*d* transitions to a portion where the radius d is shortest. At this time, according to the profile of the cam outer peripheral surface L10 where the radius d gently and slowly becomes shorter, the distance R between the spring supporting surface 45*d* and the spring supporting surface 47*d* is changed in the direction of slowly becoming longer. Thus, the pressurization force of the pressurization spring 44*d* slowly becomes smaller.

In this switching, the distance R is gently and slowly changed, although in the direction in which the pressurization force becomes smaller. Thus, the pressurization spring 44*d* is not released at once, and the cam 71*d* is not pushed at once, either. Thus, a hitting sound due to a collision in the driving unit is not generated by the preceding rotation of the cam 71*d*.

In FIG. 19, the cam abutment surface 49*d* and the outer peripheral surfaces of the cam 71*d* are still away from each other, and the heating roller 19 remains in the state where the heating roller 19 pressurizes the pressure roller 20. If the cam 71*d* further rotates from this state, the cam abutment surface 49*d* and the outer peripheral surface L9 of the cam 71*d* start abutting each other, the pressurization force of the pressurization spring 44*d* is received by the cam 71*d*, and the heating roller 19 transitions to the pressure release state where the heating roller 19 does not pressurize the pressure roller 20.

In the cam 71*d* according to the second exemplary embodiment, the outer peripheral surfaces of the cam 71*d* are formed of the circular arc portions L1 to L10, whereby, even if the angle of rotation deviates due to an error in the angle of rotation of the cam 71*d* in the ranges of the arc lengths of the circular arc portions L1 to L10, the positions of two components, namely the pressurization plate 38*d* and the pressurization force variable plate 48*d*, do not change. It is also possible that the error is absorbed by the distance from a motor that rotationally drives the cam 71*d*, rotational rattling due to backlash in a driving gear train that transmits the rotation of an output shaft of the motor to the cam 71*d*, or small torsion of the cam shaft 52.

Similarly to the first exemplary embodiment (see FIG. 10), in the relative positional relationship between the pressurization spring 44*d* and the cam 71*d* according to the second exemplary embodiment, the cam 71*d* is placed in a range on the central axis of the pressurization spring 44*d*. Thus, the cam 71*d* can receive a great pressurization force from the pressurization spring 44*d* at its center-of-gravity position. That is, a configuration is employed in which it is possible to reduce the risk that the cam 71*d* tilts by receiving a pressurization force, and the frame body itself strains due to the tilt.

Effects of Second Exemplary Embodiment

As described above, based on the pressurization mechanism 35 according to the second exemplary embodiment, it is possible to reduce an impact sound due to the preceding rotation of the cam 71*d* both at the timing when a pressure release state transitions to a pressurization state and at the timing when the pressurization state transitions to the pressure release state. Further, it is possible to achieve the provision of a pressurization mechanism in which the pressurization force of a pressurization member is not lost in a pressurization state and a light pressurization state, and an image forming apparatus including the pressurization mechanism.

In the second exemplary embodiment, the pressurization mechanism 35 has the light pressurization state. In the light pressurization state, the pressurization force is smaller than in the pressurization state, and therefore, the nip width, the fixability, and the conveyance force are also different. A plurality of pressure positions is provided, whereby it is possible to select a state suitable for the sheet S to be conveyed.

In the second exemplary embodiment, it is preferable to employ a configuration in which at two positions in the pressurization state and the light pressurization state, the cam abutment surface 49*d* of the pressurization plate 38*d* and the outer peripheral surfaces of the cam 71*d* are brought into the state where the cam abutment surface 49*d* of the pressurization plate 38*d* and the outer peripheral surfaces of the cam 71*d* are away from each other at certain distances and do not abut each other, thereby preventing the pressurization force from being lost. Thus, while there is small room for profile phase areas on the cam outer peripheral surfaces, it is possible to enjoy the maximum benefit of the effects obtained in the present exemplary embodiment.

Next, with reference to FIGS. 20 to 22B, the configurations of a sheet supply device and a pressurization mechanism are described as an example where a pressurization mechanism according to a third exemplary embodiment is used.

Sheet Supply Device

Figure 20:
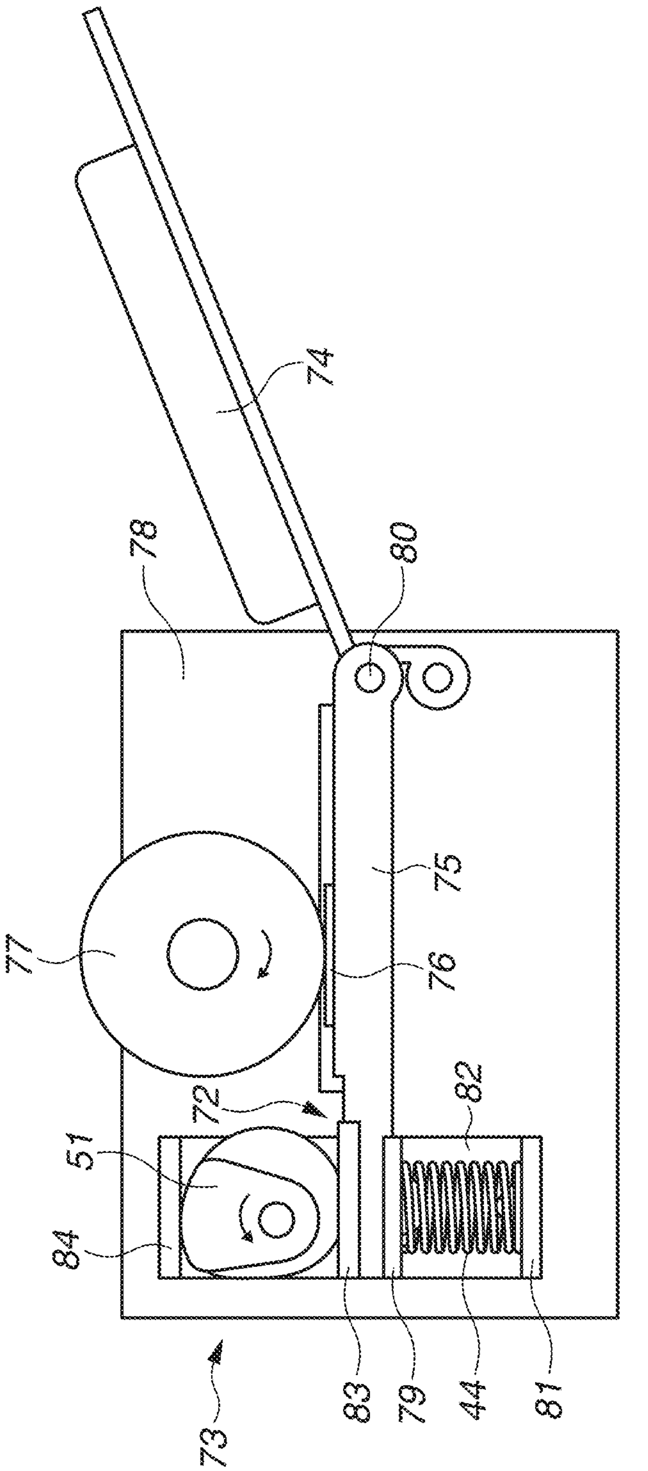
FIG. 20 is a side view illustrating a configuration of a pressurization mechanism according to a third exemplary embodiment.
Figure 21:
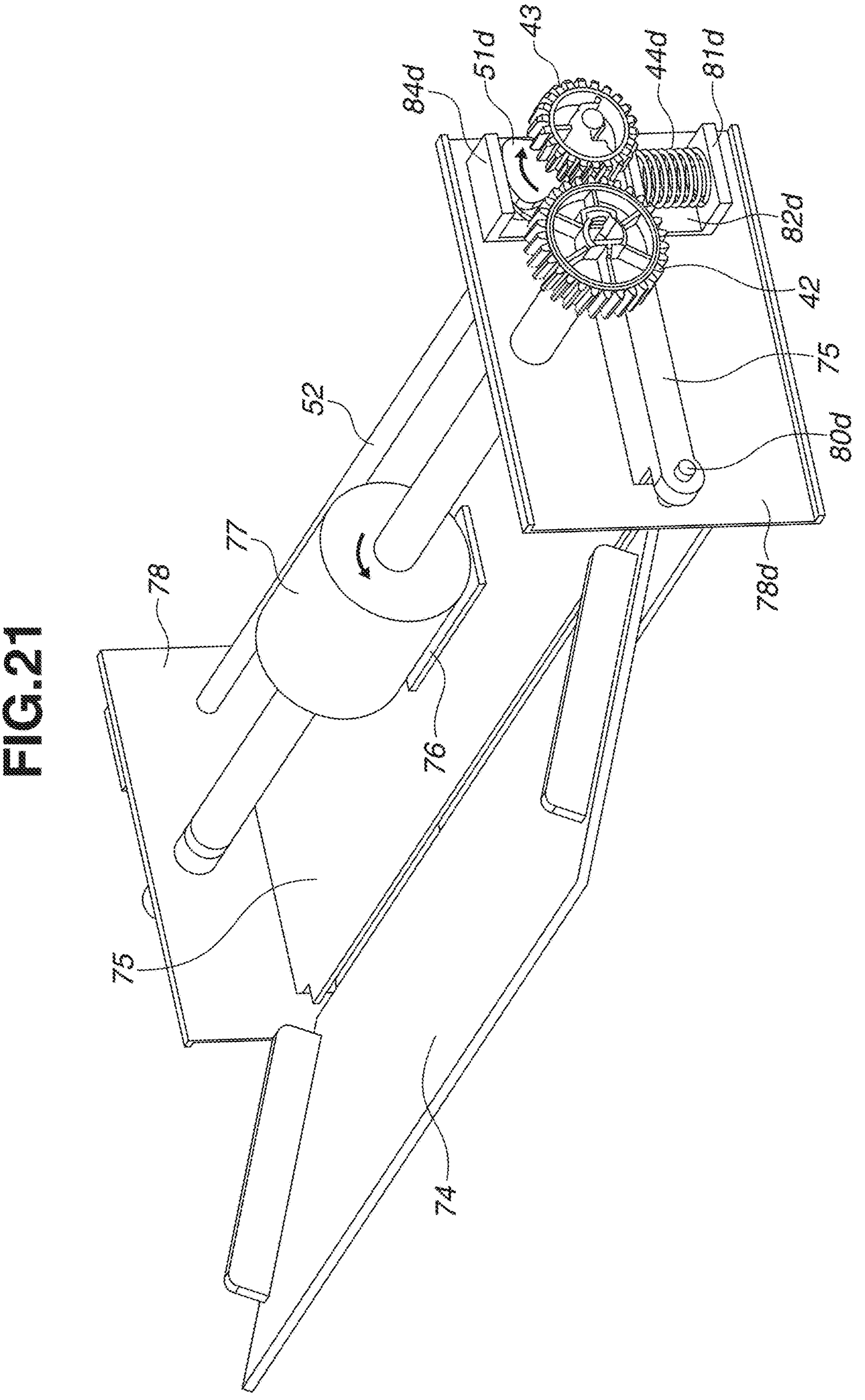
FIG. 21 is a perspective view illustrating a sheet supply device from a driving side according to the third exemplary embodiment.

FIG. 20 is a side view illustrating a sheet supply device 73 including a pressurization mechanism 72 according to the third exemplary embodiment as seen from a non-driving side. FIG. 21 is a perspective view illustrating the sheet supply device 73 from a driving side.

The sheet supply device 73 includes the pressurization mechanism 72, a manual-bypass tray 74, a pad (pressurization member) 76 attached to a swinging tray 75 placed downstream of a base tray, and a feeding roller (pressurization target member) 77. On both sides of the manual-bypass tray 74 in the width direction of a bundle of sheets, restriction portions are movably provided to restrict the width positions of the bundle of sheets according to the size in the width direction of each sheet. Further, in the sheet supply device 73, a frame 78 constitutes the frame body of the sheet supply device 73. The manual-bypass tray 74, the swinging tray 75, the feeding roller 77, and the pressurization mechanism 72 are supported by the frame 78.

The pad 76 is made of a friction material, and is attached to a tray surface of the swinging tray 75 so as to pressurize the feeding roller 77. The feeding roller 77 is rotatably supported by the frame 78 and disposed so that the outer peripheral surface (the surface) of the feeding roller 77 comes into contact with the pad 76.

Then, a gear 42 is firmly fixed to one shaft portion of the feeding roller 77.

In the sheet supply device 73 according to the third exemplary embodiment, the swinging tray 75 applies a pressurization force, thereby pressurizing the pad 76 in a direction orthogonal to the generatrix direction of the feeding roller 77. This generates a nip pressure between the pad 76 and the feeding roller 77.

The sheet conveyance operation of the sheet supply device 73 is described. The driving force of a motor (not illustrated) included in the apparatus main body 100 is transmitted to the gear 42, thereby rotating the feeding roller 77.

To sheets S stacked on the tray 75, a nip pressure is applied. This generates a sufficient conveyance force, and the sheets S are conveyed while being separated one by one by the friction of the pad 76.

Pressurization Mechanism 72

With reference to FIGS. 20 and 21, the configuration of the pressurization mechanism 72 is described. The pressurization mechanism 72 is configured to be symmetric with respect to the center in the longitudinal direction of a heating roller except that the pressurization mechanism 72 includes a gear 43 on one end portion side in the longitudinal direction of the pressurization mechanism 72.

The pressurization mechanism 72 includes a pressurization spring (pressurization force generation member) 44 constituted by a compression spring that is caused to contract from its both end portions, thereby generating a pressurization force in the direction of expanding.

The pressurization mechanism 72 includes the swinging tray 75 (a first member) on which a large number of sheets S are mounted and which includes at its one end a spring supporting surface 79 that holds down one end of the pressurization spring 44, and a pivot point portion 80 as a pivot point about which the swinging tray 75 pivots at the other end.

The swinging tray 75 supporting the pressurization spring 44 on the spring supporting surface 79 pivots about the pivot point portion 80 as the pivot point by a pressurization force generated by the pressurization spring 44. Consequently, the pad 76 attached to the tray surface pressurizes the feeding roller 77.

Similarly to the swinging tray 75, the sheet supply device 73 includes a pressurization force variable plate 82 (a second member) including at its one end a spring supporting surface 81 that holds down the other end of the pressurization spring 44.

The pressurization force variable plate 82 is disposed to move in a sliding manner in approximately parallel with the expansion/contraction direction of the pressurization spring 44 and supports the other end of the pressurization spring 44 on the spring supporting surface 81. The pressurization force variable plate 82 moves in a sliding manner, thereby causing the pressurization force generated by the pressurization spring 44 to act on the swinging tray 75 in a changeable manner.

The pressurization mechanism 72 also includes a cam 51 (a cam mechanism) between a cam abutment surface 83 placed on the opposed side of the spring supporting surface 79 in the tray 75 and a cam abutment surface 84 located at an end of the pressurization force variable plate 82 on a different side from the spring supporting surface 81. The cam 51 is fixed to an end portion in the longitudinal direction of a cam shaft 52 disposed along the longitudinal direction. The cam shaft 52 is rotatably supported by the frame 78. To one end portion in the longitudinal direction of the cam shaft 52, the gear 43 is fixed. The gear 43 is rotationally driven in the direction of an arrow by obtaining a driving force from a motor (a driving source) (not illustrated) included in the apparatus main body 100.

While the cam 51 rotates, outer peripheral surfaces of the cam 51 abut the cam abutment surface 83 of the swinging tray 75 and the cam abutment surface 84 of the pressurization force variable plate 82. By this motion, the swinging tray 75 pivotally moves about the pivot point portion 80 as the pivot point, and the pad 76 attached to the tray surface comes close to or moves away from the feeding roller 77, thereby switching between a pressurization state and a pressure release state.

Next, the details of the shapes of a cam and a cam abutment surface A according to the third exemplary embodiment are described.

Shape of Cam According to Third Exemplary Embodiment

The shape of the cam is the same shape as that according to the first exemplary embodiment (see FIGS. 5A and 5B). The details are not described.

Cam Abutment Surface A According to Third Exemplary Embodiment

Similarly to the first exemplary embodiment (see FIG. 6), in the cam abutment surface 83 according to the third exemplary embodiment, a hole portion 54 is provided in a range overlapping the area S2 in the longitudinal direction among the cam outer peripheral surfaces. Thus, when the outer peripheral surface L5 rotates to a position overlapping the cam abutment surface 83, the outer peripheral surface L5 also fits in the hole portion 54. Thus, the outer peripheral surface L5 does not abut and act on the cam abutment surface 83.

Figure 22A:
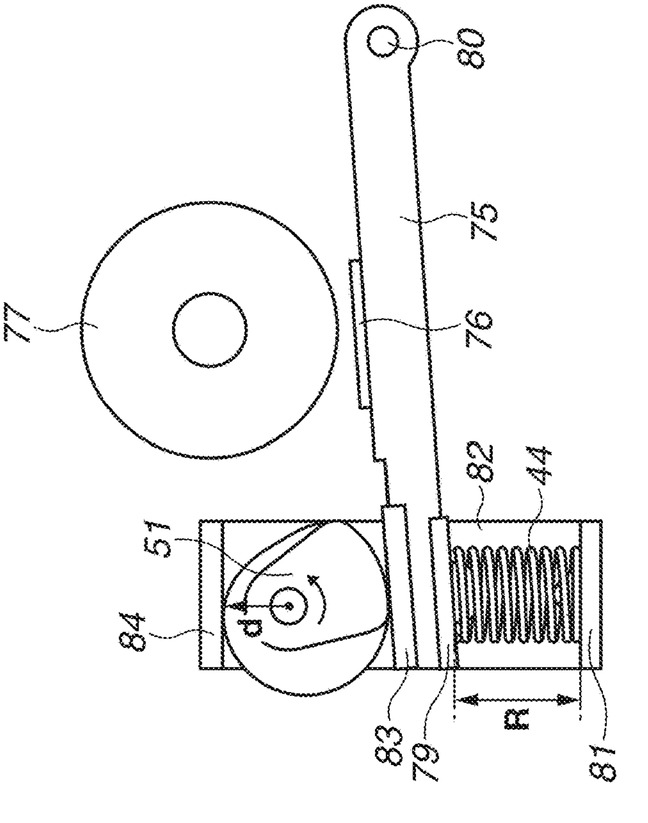
FIGS. 22A and 22B are operation illustration diagrams illustrating the pressurization mechanism according to the third exemplary embodiment.
Figure 22B:
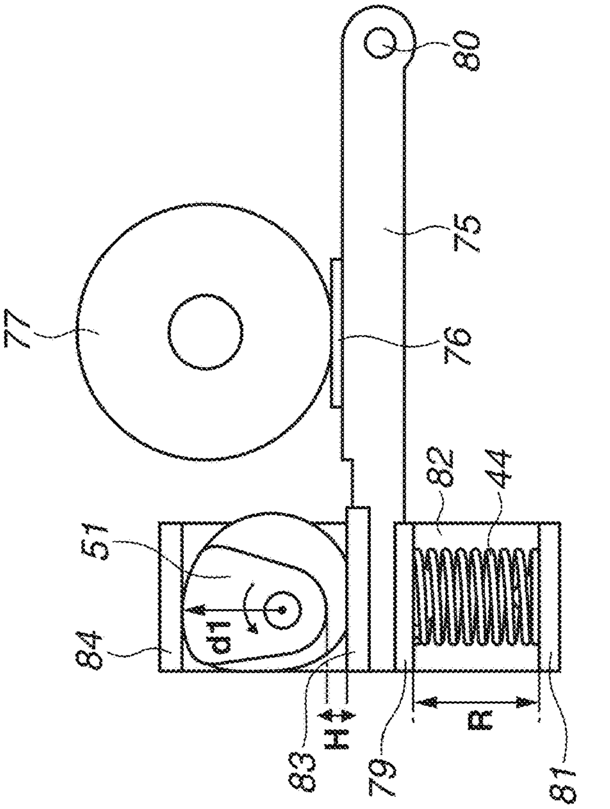

Operation of Pressurization Mechanism 72 According to Third Exemplary Embodiment Next, with reference to FIGS. 22A and 22B, the operation of the pressurization mechanism 72 according to the third exemplary embodiment is described. FIGS. 22A and 22B are operation illustration diagrams illustrating the operation of the pressurization mechanism 72 as seen from the non-driving side and are operation diagrams illustrating the state where the cam 51 rotates counterclockwise, and the pad 76 switches from the pressure release state where the pad 76 does not pressurize the feeding roller 77 to the pressurization state where the pad 76 pressurizes the feeding roller 77.

In FIG. 22A, similarly to the description in the first exemplary embodiment (see FIG. 7A), the cam 51, the swinging tray 75, the pressurization force variable plate 82, and a pressurization force variable plate 82*d* are movable. Consequently, the pad 76 is located at a position away from the feeding roller 77 and is in the pressure release state where the pad 76 does not receive the pressurization forces of the pressurization spring 44 and a pressurization spring 44*d*.

In the state 1 in the middle of switching (from the pressurization state to the pressure release state), similarly to the first exemplary embodiment (see FIG. 7B), the cam 51, the swinging tray 75, and the pressurization force variable plate 82 are movable. Since this switching is performed in the direction in which the pressurization force gradually becomes greater, the pressurization spring 44 is not released at once, and the cam 51 is not pushed at once, either. Thus, a hitting sound due to a collision in a driving unit is not generated by the preceding rotation of the cam 51.

In FIG. 22B, similarly to the description in the first exemplary embodiment (see FIG. 8A), the cam 51, the swinging tray 75, and the pressurization force variable plate 82 are movable, whereby the cam abutment surface 84 of the pressurization force variable plate 82 abuts the outer peripheral surface L1 of the cam 51. In the cam abutment surface 83 of the swinging tray 75, the outer peripheral surface L5 of the cam 51 fits in the hole portion 54. Thus, the cam 51 abuts the swinging tray 75 and receives the pressurization force generated by the pressurization spring 44. This avoids the situation where the pressurization force is not sufficiently transmitted to the feeding roller 77.

The cam abutment surface 83 of the swinging tray 75 is away from the outer peripheral surface L2 at a certain distance H and is in the state where the cam abutment surface 83 does not abut the cam outer peripheral surface. Consequently, similarly to the description in the first exemplary embodiment, the pad 76 is in the pressurization state where the pad 76 applies the pressurization forces of the pressurization springs 44 and 44*d* to the feeding roller 77. Thus, it is possible to ensure a sufficient nip force, and a feeding failure does not occur.

In the state 2 in the middle of switching (from the pressurization state to the pressure release state), similarly to the description in the first exemplary embodiment (see FIG. 8B), the cam 51, the swinging tray 75, and the pressurization force variable plate 82 are movable. In this switching, the distance R is gently and slowly changed, although in the direction in which the pressurization force becomes smaller. Thus, the pressurization spring 44 is not released at once, and the cam 51 is not pushed at once, either. Thus, a hitting sound due to a collision in the driving unit is not generated by the preceding rotation of the cam 51.

Effects of Third Exemplary Embodiment

As described above, based on the pressurization mechanism 72 according to the third exemplary embodiment, it is possible to reduce an impact sound due to the preceding rotation of the cam 51 not only in a fixing device but also in a sheet supply device. Further, it is possible to achieve the provision of a sheet supply device in which the pressurization force of a pressurization member is not lost in a pressurization state.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-144452, filed Sep. 6, 2023, which is hereby incorporated by reference herein in its entirety.

What is claimed is:

1. A pressurization device that includes a pressurization member and a pressurization target member and switches between a pressurization state where the pressurization member pressurizes the pressurization target member and a pressure release state where the pressurization member does not pressurize the pressurization target member, the pressurization device comprising:

a pressurization force generation member configured to generate a pressurization force;

a cam that is rotatably supported;

a first member configured to abut the cam and change in position by rotation of the cam, the first member being configured to abut the pressurization member, move the pressurization member in a direction toward the pressurization target member and in a direction away from the pressurization target member and apply the pressurization force generated by the pressurization force generation member to the pressurization member; and a second member configured to abut the cam and change in position by the rotation of the cam, the second member being configured to make the pressurization force generated by the pressurization force generation member variable, wherein the cam includes a plurality of circumferentially formed cam outer peripheral surfaces at different positions in a rotational axis direction of the cam, wherein the plurality of cam outer peripheral surfaces is configured to act on the second member regardless of a phase of the cam, and a first cam outer peripheral surface among the plurality of cam outer peripheral surfaces does not act on the first member in a positional relationship where at least a part of the first cam outer peripheral surface overlaps the first member, and wherein the first member is provided with an action-avoiding opening or recess such that at least a part of said first cam outer peripheral surface is permitted to enter into the opening or recess without contacting the first member, thereby preventing the first cam outer peripheral surface from acting on the first member throughout the rotation of the cam.

2. The pressurization device according to claim 1, wherein in switching of the pressurization member from the pressurization state to the pressure release state by the rotation of the cam, a radius of the first cam outer peripheral surface in a phase where the first cam outer peripheral surface abuts the second member while the pressurization member transitions from a position where the pressurization force generated by the pressurization force generation member is maximum in a direction in which the pressurization force becomes smaller is changed to gradually become shorter and is greater than a radius of another cam outer peripheral surface in a same phase among the plurality of cam outer peripheral surfaces.

3. The pressurization device according to claim 1, wherein the first cam outer peripheral surface and another cam outer peripheral surface among the plurality of cam outer peripheral surfaces include cam outer peripheral surfaces partially having a same shape.

4. The pressurization device according to claim 1, wherein the cam is formed of a unified component.

5. The pressurization device according to claim 1, wherein the first and second members are placed to be opposed to each other across the cam.

6. The pressurization device according to claim 1, wherein the pressurization force generation member is placed at a position overlapping the cam in the rotational axis direction of the cam.

7. The pressurization device according to claim 1, wherein the first cam outer peripheral surface is placed at a position different from a position of the first member in the rotational axis direction of the cam.

8. The pressurization device according to claim 1, wherein in the pressurization state where the pressurization member pressurizes the pressurization target member, the second member includes a plurality of different positions, and the cam acts on the second member, changes a position of the second member and changes the pressurization force of the pressurization force generation member.

9. The pressurization device according to claim 1, wherein the first member is a pressurization plate, one surface of which abuts the cam and another surface of which abuts the pressurization force generation member.

10. The pressurization device according to claim 1, wherein the second member is a pressurization force variable plate, one surface of which abuts the cam and which moves in a sliding manner by the rotation of the cam.

11. An image forming apparatus comprising:

an image forming unit configured to form an image on a sheet; and a fixing device configured to fix the image formed on the sheet by the image forming unit to the sheet, wherein the fixing device includes the pressurization device according to claim 1.

12. An image forming apparatus comprising:

a sheet feeding device configured to feed a sheet; and an image forming unit configured to form an image on the sheet fed by the sheet feeding device, wherein the sheet feeding device includes the pressurization device according to claim 1.

* * * * *